US010021345B2

(12) United States Patent
Horiuchi et al.

(10) Patent No.: US 10,021,345 B2
(45) Date of Patent: Jul. 10, 2018

(54) COMMUNICATION MANAGEMENT SYSTEM, COMMUNICATION TERMINAL, COMMUNICATION SYSTEM, COMMUNICATION CONTROL METHOD, AND RECORDING MEDIUM

(71) Applicants: Takeshi Horiuchi, Tokyo (JP); Atsushi Nakafuji, Tokyo (JP); Takahiro Asai, Kanagawa (JP); Yohei Yamamoto, Tokyo (JP); Yoshikazu Goto, Kanagawa (JP)

(72) Inventors: Takeshi Horiuchi, Tokyo (JP); Atsushi Nakafuji, Tokyo (JP); Takahiro Asai, Kanagawa (JP); Yohei Yamamoto, Tokyo (JP); Yoshikazu Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/818,580

(22) Filed: Aug. 5, 2015

(65) Prior Publication Data
US 2016/0044278 A1 Feb. 11, 2016

(30) Foreign Application Priority Data

Aug. 8, 2014 (JP) .................... 2014-162238
Jul. 30, 2015 (JP) .................... 2015-150340

(51) Int. Cl.
H04N 7/14 (2006.01)
H04N 7/15 (2006.01)
(Continued)

(52) U.S. Cl.
CPC ......... H04N 7/147 (2013.01); H04L 12/1818 (2013.01); H04L 65/1069 (2013.01);
(Continued)

(58) Field of Classification Search
CPC combination set(s) only.
See application file for complete search history.

(56) References Cited

U.S. PATENT DOCUMENTS 7,096,193 B1* 8/2006 Beaudoin ......... G06Q 10/06311
705/26.1
9,288,374 B1* 3/2016 Cooper .................. H04N 5/232
(Continued)

FOREIGN PATENT DOCUMENTS

| JP | 2008-227577 | 9/2008 |
| JP | 2009-037726 | 2/2009 |
| JP | 2013-030853 | 2/2013 |

OTHER PUBLICATIONS

U.S. Appl. No. 14/753,903, filed Jun. 29, 2015, Horiuchi, et al.
U.S. Appl. No. 14/753,903, filed Jun. 29, 2015.

Primary Examiner — Duc Nguyen
Assistant Examiner — Assad Mohammed
(74) Attorney, Agent, or Firm — Oblon, McClelland, Maier & Neustadt, L.L.P.

(57) ABSTRACT

A communication management system transmits questionnaire information including a set of questions relating to one or more services available to a communication terminal to the communication terminal through a network, receives answer information including a set of answers to the set of questions from the communication terminal through the network, determines a service to be provided to the communication terminal based on the answer information, and transmits to a relay device an operating parameter for controlling the relay device in transmitting or receiving content data to or from the communication terminal according to the determined service.

18 Claims, 25 Drawing Sheets

(51) Int. Cl.
*H04L 29/06* (2006.01)
*H04L 12/18* (2006.01)

(52) U.S. Cl.
CPC .......... *H04L 65/4038* (2013.01); *H04L 65/80* (2013.01); *H04N 7/15* (2013.01)

(56) References Cited

U.S. PATENT DOCUMENTS

| | | | | |
|---|---|---|---|---|
| 2002/0198780 A1* | 12/2002 | Kawakami | ............. | G06Q 30/02 705/14.61 |
| 2004/0203648 A1* | 10/2004 | Wong | ............. | H04W 4/18 455/414.1 |
| 2007/0192166 A1* | 8/2007 | Van Luchene | .... | G06F 17/30646 705/14.54 |
| 2007/0196805 A1* | 8/2007 | Jo | ............. | H04N 5/44513 434/323 |
| 2008/0008170 A1* | 1/2008 | Yoshimi | ............. | H04L 67/141 370/389 |
| 2008/0232565 A1* | 9/2008 | Kutt | ............. | G06Q 20/065 379/93.12 |
| 2011/0145920 A1* | 6/2011 | Mahaffey | ............. | G06F 21/564 726/22 |
| 2011/0306368 A1* | 12/2011 | McCarthy | ............. | G06Q 30/0241 455/466 |
| 2012/0254354 A1* | 10/2012 | Iwami | ............. | H04L 12/189 709/217 |
| 2013/0073384 A1* | 3/2013 | Qiu | ............. | H04L 65/4084 705/14.49 |
| 2013/0290418 A1* | 10/2013 | Liu | ............. | H04L 12/1854 709/204 |
| 2014/0282742 A1* | 9/2014 | Demsey | ............. | H04N 21/47214 725/58 |
| 2015/0189552 A1* | 7/2015 | Cazanas | ............. | H04W 28/18 709/227 |

* cited by examiner

FIG. 8

SERVICE CONTENTS MANAGEMENT TABLE

| SESSION ID | FRAME RATE (fps) | RESOLUTION | BIT RATE (kbps) | ENCODING FORMAT | TERMINAL IP ADDRESS |
|---|---|---|---|---|---|
| se1 | 30 | SD | 1024 | H.264/SVC | 1.2.1.3, 1.3.2.4 |
| se2 | 10 | HD | 256 | H.264/AVC | 1.2.1.4, 1.2.2.5 |
| se3 | 30 | 8K | 1024 | H.264/SVC | 1.2.2.4, 1.3.1.3 |
| ... | ... | ... | ... | ... | ... |

FIG. 10

RELAY DEVICE MANAGEMENT TABLE

| RELAY DEVICE ID | OPERATING STATE | DATE/TIME RECEIVED | IP ADDRESS OF RELAY DEVICE | MAXIMUM DATA TRANSFER RATE (Mbps) |
|---|---|---|---|---|
| 111a | ONLINE | 2014.4.10.13:00 | 1.2.1.2 | 100 |
| 111b | OFFLINE | 2014.4.10.13:10 | 1.2.2.2 | 1000 |
| 111c | ONLINE | 2014.4.10.13:20 | 1.3.1.2 | 100 |
| 111d | ONLINE | 2014.4.10.13:30 | 1.3.2.2 | 10 |

FIG. 11

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 12

TERMINAL MANAGEMENT TABLE

| TERMINAL ID | COUNTERPART TERMINAL NAME | OPERATING STATE | DATE/TIME RECEIVED | IP ADDRESS OF TERMINAL | SERVICE ID |
|---|---|---|---|---|---|
| 01aa | AA TERMINAL, TOKYO OFFICE, JAPAN | ONLINE (COMMUNICATION OK) | 2014.4.10.13:40 | 1.2.1.3 | sv103 |
| 01ab | AB TERMINAL, OSAKA OFFICE, JAPAN | OFFLINE | 2014.4.09.12:00 | 1.2.1.4 | sv201 |
| ... | ... | ... | ... | ... | ... |
| 01ba | BA TERMINAL, BEIJINIG OFFICE, CHINA | ONLINE (COMMUNICATION OK) | 2014.4.10.13:45 | 1.2.2.3 | sv101 |
| 01bb | BB TERMINAL, SHANGHAI OFFICE, CHINA | ONLINE (INTERRUPTED) | 2014.4.10.13:50 | 1.2.2.4 | sv103 |
| ... | ... | ... | ... | ... | ... |
| 01ca | CA TERMINAL, WASHINGTON D.C. OFFICE, U.S. | OFFLINE | 2014.4.10.12:45 | 1.3.1.3 | sv101 |
| 01cb | CB TERMINAL, NEW YORK OFFICE, U.S. | ONLINE (COMMUNICATING) | 2014.4.10.13:55 | 1.3.1.4 | sv103 |
| ... | ... | ... | ... | ... | ... |
| 01da | DA TERMINAL, BERLIN OFFICE, EUROPE | ONLINE (COMMUNICATING) | 2014.4.08.12:45 | 1.3.2.3 | sv1201 |
| 01db | DB TERMINAL, LONDON OFFICE, EUROPE | ONLINE (COMMUNICATION OK) | 2014.4.10.12:45 | 1.3.2.4 | sv203 |
| ... | ... | ... | ... | ... | ... |

FIG. 13

CANDIDATE LIST MANAGEMENT TABLE

| TERMINAL ID OF STARTING TERMINAL | TERMINAL ID OF COUNTERPART TERMINAL |
|---|---|
| 01aa | 01ab, ···, 01ba, 01bb, ···, 01ca, 01cb, 01da, 01db, ··· |
| 01ab | 01aa, 01ca, 01cb |
| 01ba | 01aa, 01ab, 01ca, 01cb, 01da, 01db |
| ... | ... |
| 01db | 01aa, 01ab, 01ba, ···, 01da, 01ca, 01cb, ···, 01da |

FIG. 14

SESSION MANAGEMENT TABLE

| SELECTION SESSION ID | RELAY DEVICE ID | TERMINAL ID OF STARTING TERMINAL | TERMINAL ID OF COUNTERPART TERMINAL | DELAY TIME (ms) | DELAY INFORMATION DATE/TIME RECEIVED |
|---|---|---|---|---|---|
| se1 | 111d | 01aa | 01db | 200 | 2014.4.10.14:00 |
| se2 | 111c | 01ca | 01cb | 100 | 2014.4.10.14:10 |
| se3 | 111a | 01ab | 01ac | 50 | 2014.4.10.14:20 |
| ... | ... | ... | ... | ... | ... |

FIG. 15

QUESTION MANAGEMENT TABLE

| QUESTION ID | QUESTION CONTENTS | OPTION 1 | OPTION 2 | OPTION 3 |
|---|---|---|---|---|
| q001 | How much degree will an object move, when capturing the object for display? | The entire object is constantly moving. | A part of the object is constantly moving. | The object rarely moves. |
| q002 | How big is it a screen for display? | LARGE SCREEN | TV | SMART PHONE |
| ... | ... | ... | ... | ... |

FIG. 16

PREFERRENTIAL RATING MANAGEMENT TABLE

| QUESTION ID: q001 | q002 | ... |
|---|---|---|

| SERVICE ID \ OPTION NUMBER | 1 | 2 | 3 |
|---|---|---|---|
| sv101 | 10 | 5 | −5 |
| sv102 | 3 | 2 | −2 |
| sv103 | −5 | −1 | 1 |
| ... | ... | ... | ... |
| sv201 | 10 | 5 | −5 |
| sv202 | 3 | 2 | −2 |
| sv203 | −5 | −1 | 1 |
| ... | ... | ... | ... |

FIG. 17

SERVICE MANAGEMENT TABLE

| SERVICE ID | FRAME RATE (fps) | RESOLUTION | BIT RATE (kbps) | ENCODING FORMAT | USAGE FEE (Yen/Month) |
|---|---|---|---|---|---|
| sv101 | 30 | SD | 1024 | H.264/SVC | 15,000 |
| sv102 | 20 | SD | 205 | H.264/SVC | 10,000 |
| sv103 | 10 | SD | 64 | MPEG-2 | 5,000 |
| ... | ... | ... | ... | ... | ... |
| sv201 | 30 | 8K | 1024 | H.264/SVC | 40,000 |
| sv202 | 20 | 4K | 512 | H.264/SVC | 20,000 |
| sv203 | 10 | HD | 256 | H.264/AVC | 10,000 |
| ... | ... | ... | ... | ... | ... |

FIG. 21

To see a service that suits your needs, please answer the following questions.

[Question 1]
How much degree will an object move, when capturing the object for display?
◉ 1. The entire object is constantly moving.
○ 2. A part of the object is constantly moving.
○ 3. The object rarely moves.

[Question 2]
How big is it a screen for display?
○ 1. LARGE SCREEN
○ 2. TV
◉ 3. SMART PHONE
⋮

| SEND |

FIG. 23A

| SERVICE ID | TOTAL PREFERRENTIAL RATING |
|---|---|
| sv101 | 0 |
| sv102 | 0 |
| sv103 | 0 |
| ... | ... |
| sv201 | 0 |
| sv202 | 0 |
| sv203 | 0 |
| ... | ... |

FIG. 23B

| SERVICE ID | TOTAL PREFERRENTIAL RATING |
|---|---|
| sv101 | 10 |
| sv102 | 3 |
| sv103 | -5 |
| ... | ... |
| sv201 | 10 |
| sv202 | 3 |
| sv203 | -5 |
| ... | ... |

FIG. 23C

| SERVICE ID | TOTAL PREFERRENTIAL RATING |
|---|---|
| sv101 | 15 |
| sv102 | 5 |
| sv103 | -6 |
| ... | ... |
| sv201 | 15 |
| sv202 | 5 |
| sv203 | -6 |
| ... | ... |

COMMUNICATION MANAGEMENT SYSTEM, COMMUNICATION TERMINAL, COMMUNICATION SYSTEM, COMMUNICATION CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2014-162238, filed on Aug. 8, 2014, and 2015-150340, in the Japan Patent Office, the entire disclosure of which is hereby incorporated by reference herein.

BACKGROUND

Technical Field

The present invention generally relates to managing a plurality of communication terminals that transmit or receive content data.

Description of the Related Art

An example of a communication system that transmits or receives content data between a plurality of communication terminals via a relay device includes a videoconference system that carries out videoconference via a communication network such as the Internet. There is an increasing need for such videoconference systems due to reduction in business trip costs and time in recent years. In such a videoconference system, a plurality of videoconference terminals, which are examples of communication terminals, is used. A videoconference can be carried out by transmission or reception of image data and sound data between these videoconference terminals.

In addition, the recent improvement of broadband circumstances contributes to transmission and reception of high-quality image data and high-quality sound data. Accordingly, it becomes easier to detect the circumstances of a communication partner in a videoconference, thus improving productivity of conversation-based communication.

The same communication terminal (or of the same type) may be used for different applications or purposes. For example, in the case of using a communication terminal for remote diagnosis system, an image of the affected part of a patient needs to be sent to a remote place. It is thus preferable that image data be of high quality. In contrast, in the case of using a communication terminal for a videoconference system for merely conveying a message, image data may be of low quality.

However, there is a general tendency that the higher the quality of mage data and sound data, the more expensive the usage fee of a communication system. Therefore, in the case of using the same communication terminal (or of the same type) for different applications or purposes, if the user is unable to select a communication quality that suits a particular application or purpose, the user may eventually pay a wasteful usage fee.

SUMMARY

Example embodiments of the present invention include a communication management system that transmits questionnaire information including a set of questions relating to one or more services available to a communication terminal to the communication terminal through a network, receives answer information including a set of answers to the set of questions from the communication terminal through the network, determines a service to be provided to the communication terminal based on the answer information, and transmits to a relay device an operating parameter for controlling the relay device in transmitting or receiving content data to or from the communication terminal according to the determined service.

Other example embodiments of the present invention include a communication system including the communication management system and the relay device, a method performed by the communication system, and a program for controlling operation of the communication system that is stored on a non-transitory recording medium.

BRIEF DESCRIPTION OF THE SEVERAL OF THE DRAWINGS

A more complete appreciation of the disclosure and many of the attendant advantages and features thereof can be readily obtained and understood from the following detailed description with reference to the accompanying drawings, wherein:

FIG. 8 is an illustration of an example data structure of a service contents management table;

FIG. 10 is an illustration of an example data structure of a relay device management table;

FIG. 11 is an illustration of an example data structure of an authentication management table;

FIG. 12 is an illustration of an example data structure of a terminal management table;

FIG. 13 is an illustration of an example data structure of a candidate list management table;

FIG. 14 is an illustration of an example data structure of a session management table;

FIG. 15 is an illustration of an example data structure of a question management table;

FIG. 16 is an illustration of an example data structure of a preferential rating management table;

FIG. 17 is an illustration of an example data structure of a service management table;

FIG. 21 is an example screen of questionnaire;

Figure 24:
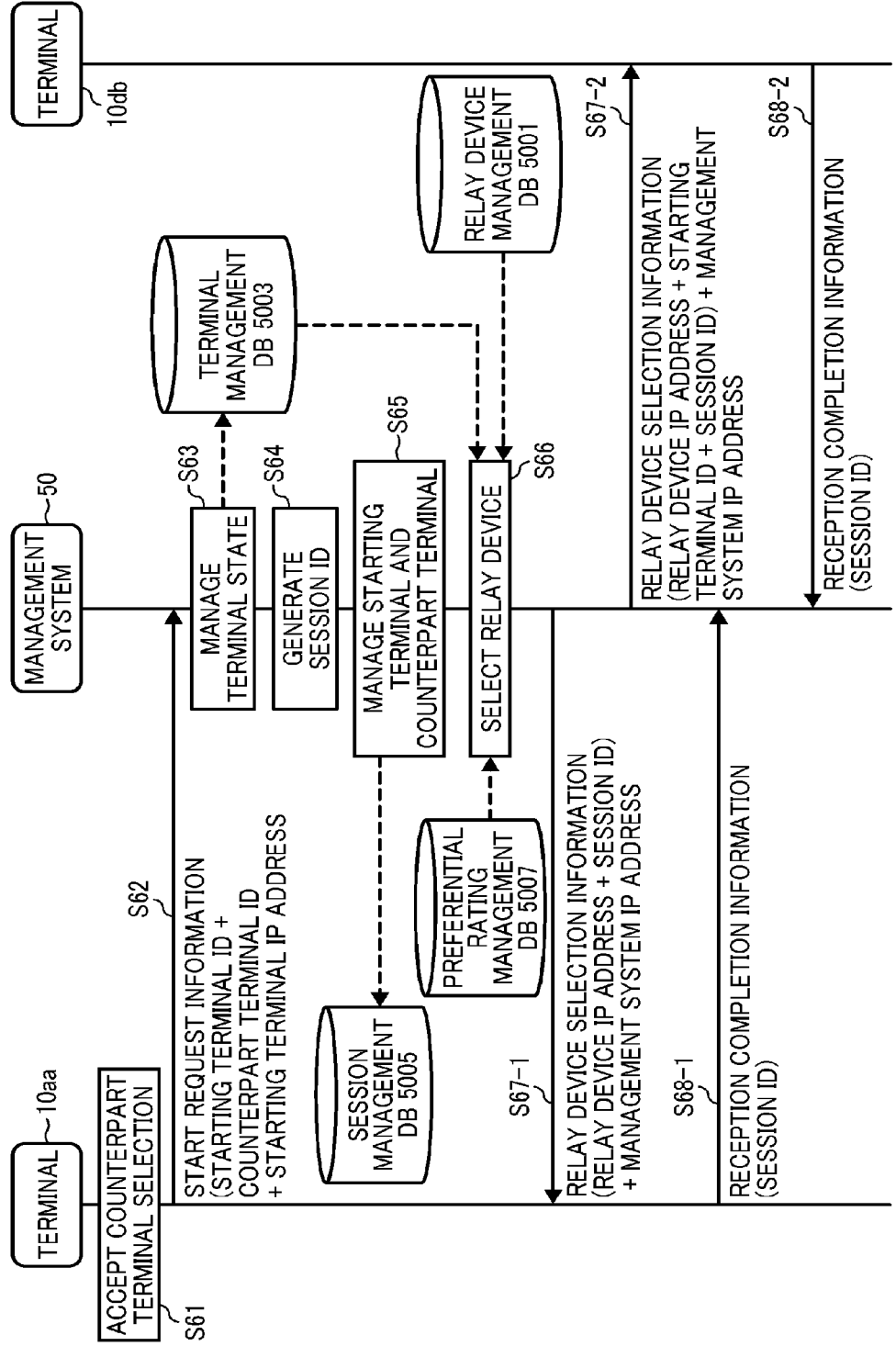
Figure 25:
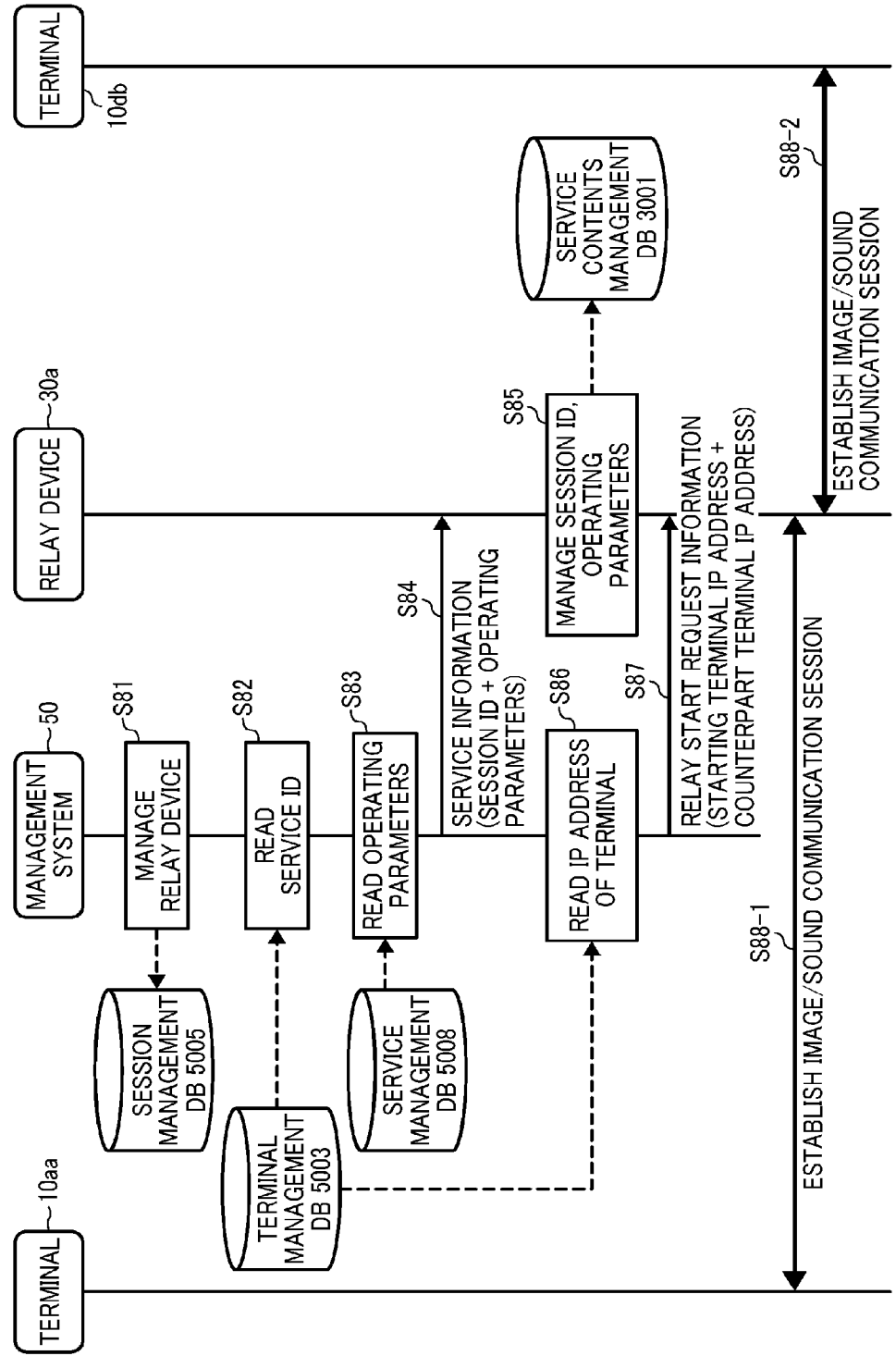
Figure 26:
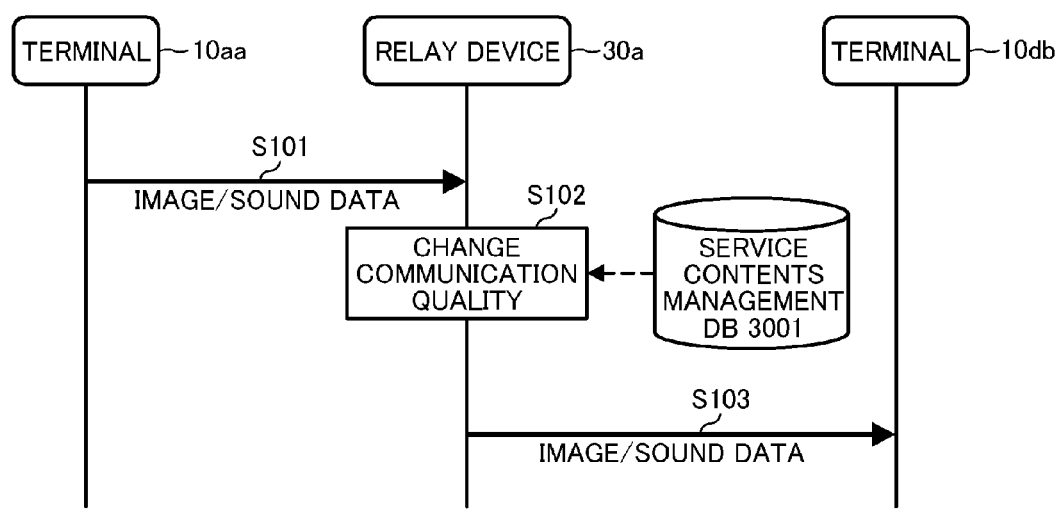

FIGS. 23A, 23B, and 23C (FIG. 23) are diagrams illustrating operation of obtaining total preferential rating;

FIG. 24 is a data sequence diagram illustrating operation of selecting a relay device, according to an embodiment of the present invention;

FIG. 25 is a data sequence diagram illustrating operation of establishing a communication session, according to an embodiment of the present invention; and FIG. 26 is a data sequence diagram illustrating operation of transmitting or receiving image data and sound data between terminals, according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring to the drawings, an embodiment of the present invention is described.

<Configuration of Videoconference System>

Figure 1:
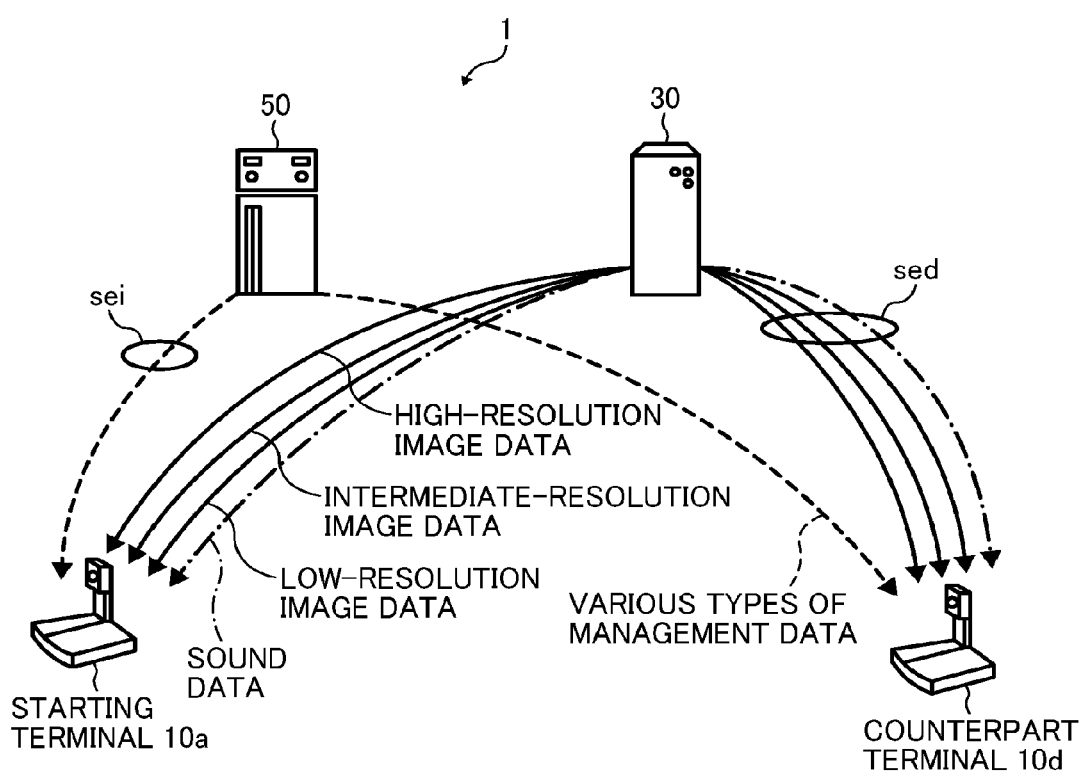
FIG. 1 is a schematic diagram illustrating a part of a communication system relating to videoconference communication, according to an example embodiment of the present invention.

Referring to FIG. 1, a communication system 1 for carrying out videoconference among a plurality of communication terminals (10a, 10d) is explained according to the embodiment. FIG. 1 is a schematic diagram illustrating a portion of the communication system 1, which relates to videoconference being carried out between the communication terminals 10a and 10d.

The communication system 1 includes the plurality of communication terminals (10a, 10d), a relay device 30, and a communication management system 50. In the following, any arbitrary one or ones of the plurality of communication terminals (10a, 10d) is or are referred to as the communication terminal 10. The communication terminal 10 transmits or receives image data and sound data as an example of content data. The image data may be a video image or a still image, or both of the video image and the still image.

In this disclosure, the communication terminal that sends a request for starting videoconference is referred to as the "starting terminal", and the communication terminal serving as a request destination (relay destination) of videoconference is referred to as the "counterpart terminal". In FIG. 1, the communication terminal 10a is referred to as the starting terminal, and the communication terminal 10d is referred to as the counterpart terminal. Alternatively, when the communication terminal 10d requests to start videoconference with the communication terminal 10a, the communication terminal 10d is referred to as the starting terminal, and the communication terminal 10a is referred to as the counterpart terminal. Note that the communication terminal 10 may be used not only for communication between different offices or for communication between different rooms in the same office, but also for communication within the same room or for outdoor-indoor communication or outdoor-outdoor communication. In the case where the communication terminal 10 is used outside, wireless communication using a mobile phone communication network or the like is performed.

The relay device 30 relays content data among the plurality of communication terminals 10. The communication management system 50 centrally controls login authentication of the communication terminal 10, management of the communication state of the communication terminal 10, management of a candidate list or the like, and management of the communication state or the like of the relay device 30.

In the communication system 1, a management data session "sei" is established between the starting terminal 10 and the counterpart terminal 10 via the communication management system 50 to transmit or receive various management data therebetween. Between the starting terminal 10 and the counterpart terminal 10, four sessions are established via the relay device 30 to transmit or receive four items of data including high-resolution image data, intermediate-resolution image data, low-resolution image data, and sound data. In FIG. 1, these four sessions are collectively referred to as image and sound data session "sed". The image and sound data session "sed" may not always include four sessions, but any number of sessions greater than or less than four.

Now, resolution of image data to be processed in this embodiment is described. The low-resolution image data serves as a base image and has horizontal 160 pixels by vertical 120 pixels. The intermediate-resolution image data has horizontal 320 pixels by vertical 240 pixels. The high-resolution image data has horizontal 640 pixels by vertical 480 pixels. In the case of a narrow band path, low-quality image data that only includes low-resolution image data serving as a base image is relayed. In the case of a relatively wide band path, intermediate-quality image data including low-resolution image data serving as a base image and intermediate-resolution image data is relayed. In addition, in the case of a very wide band path, high-quality image data including low-resolution image data serving as a base image, intermediate-resolution image data, and high-resolution image data is relayed. Since sound data is relatively small in data size, the sound data is relayed even in the case of a narrow band path.

Examples of the communication system 1 include a data providing system that performs one-way transmission of content data from one communication terminal to another communication terminal via a communication management system, and a communication system that intercommunicates information, information reflecting feelings, or the like between a plurality of communication terminals via a communication management system. The communication system is a system for intercommunicating information, information reflecting feelings, or the like between a plurality of communication terminals via a communication management system, and examples thereof include a teleconference system and a videoconference system.

In this embodiment, the communication system, the communication management system, and the communication terminal will be described while assuming a videoconference system serving as an example of the communication system, a videoconference management system serving as an example of the communication management system, and a videoconference terminal serving as an example of the communication terminal. That is, the communication terminal and the communication management system according to the embodiment of the present invention are applied not only to a videoconference system, but also to any desired communication system.

<Hardware Configuration of Communication System>

Figure 2:
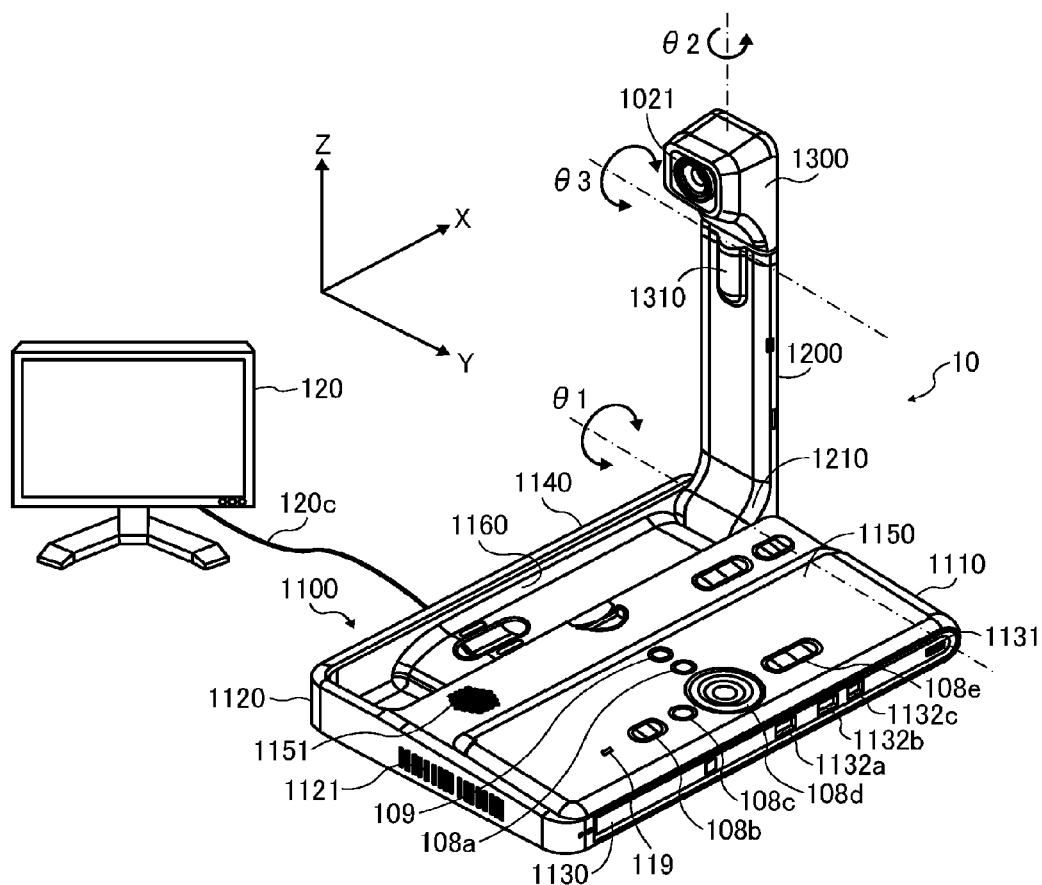
FIG. 2 is a perspective view illustrating an outer appearance of a communication terminal of the communication system of FIG. 1.

Now, a hardware configuration of the communication system 1 is described. FIG. 2 is a perspective view illustrating an outer appearance of the communication terminal 10 of the communication system 1 of FIG. 1. As illustrated in FIG. 2, the communication terminal 10 includes a casing 1100, an arm 1200, and a camera housing 1300. The casing 1100 has a front wall 1110 provided with an inlet face including a plurality of inlet holes, and a back wall 1120 having an exhaust face 1121 on which a plurality of exhaust holes is formed. As a cooling fan included in the casing 1100 is driven, air behind the communication terminal 10 can be taken in via the inlet face and exhausted to the rear of the communication terminal 10 via the exhaust face 1121. A right-side wall 1130 of the casing 1100 has a sound pickup hole 1131 formed thereon, and a built-in microphone 114, described later, is capable of picking up sound such as sound, noise, or vibration.

An operation panel 1150 is formed toward the right-side wall 1130 of the casing 1100. The operation panel 1150 has a plurality of operation keys (108a to 108e) described later, a power switch 109 described later, and an alarm lamp 119 described later, which are formed thereon. The operation panel 1150 further has a sound output face 1151 formed thereon, which is formed of a plurality of sound output holes for allowing output sound from a built-in speaker 115 described later to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later is provided on the right-side wall 1130 of the casing 1100. In contrast, a connection port for electrically connecting a cable 120c for a display 120 to the external device connection I/F 118 described later is provided toward the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210 so as to be rotatable in the vertical direction within the range of a tilt angle θ1 of 135 degrees with respect to the casing 1100. FIG. 2 illustrates a state in which the tilt angle θ1 is 90 degrees. The camera housing 1300 has a built-in camera 112 provided thereon, which will be described later, and the camera 112 can capture an image of a user, a document, a room, or the like. The camera housing 1300 is formed with a torque hinge 1310. With the torque hinge, the camera housing 1300 is attached to the arm 1200. The camera housing 1300 is made rotatable in the vertical and horizontal directions within the range of a pan angle θ2 of ±180 degrees and a tilt angle θ3 of ±45 degrees with respect to the arm 1200, in which the state illustrated in FIG. 2 serves as 0 degrees.

Note that the external view illustrated in FIG. 2 is only exemplary and the appearance is not restricted thereto. The camera 112 and the microphone 114 need not necessarily be built-in devices and may be external devices. Since the communication management system 50 has the same appearance as that of a general server computer, a description of the appearance thereof is omitted.

Figure 3:
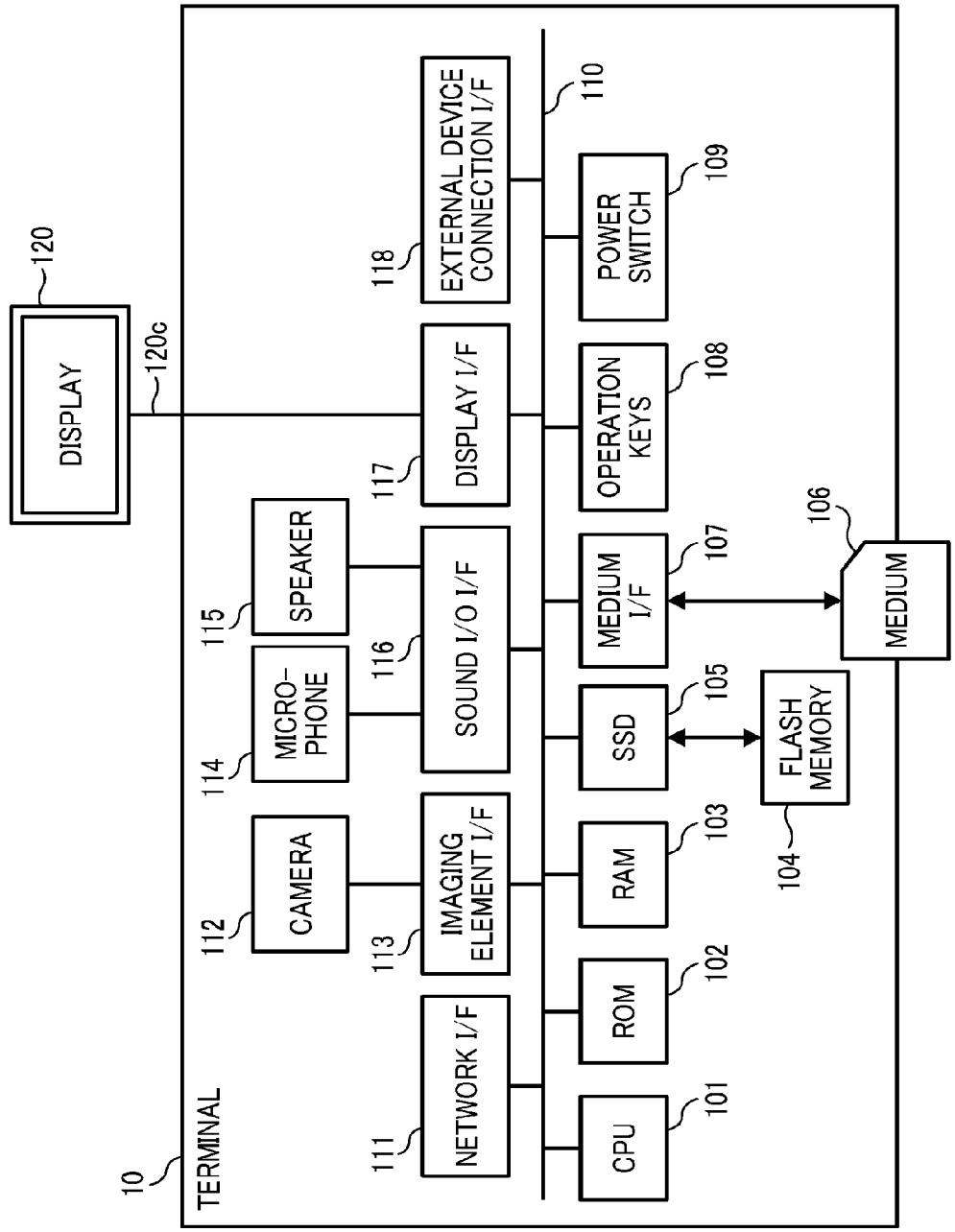
FIG. 3 is a schematic block diagram illustrating a hardware configuration of the communication terminal of FIG. 2.

FIG. 3 is a schematic block diagram illustrating a hardware configuration of the communication terminal 10. As illustrated in FIG. 3, the communication terminal 10 of the embodiment includes a central processing unit (CPU) 101 that controls entire operation of the communication terminal 10, a read only memory (ROM) 102 that stores a program for operating the CPU 101 such as an initial program loader (IPL), a random access memory (RAM) 103 that operates as a work area for the CPU 101, a flash memory 104 that stores various types of data, such as the terminal control program, image data, and sound data, a solid state drive (SSD) 105 that controls reading/writing of various types of data from/to the flash memory 104 under control of the CPU 101, a medium I/F 107 that controls reading/writing (storage) of data from/to a recording medium 106, the operation key 108 operated in the case of, for example, selecting a counterpart terminal of the communication terminal 10, the power switch 109 for turning on/off the power of the communication terminal 10, and a network interface (I/F) 111 for transmitting data using the communication network 2. In alternative to the SSD, a hard disk drive (HDD) may be used.

In addition, the communication terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sounds, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 for connecting various external devices, and a bus line 110 such as an address bus and a data bus for electrically connecting the above-described elements as illustrated in FIG. 3.

The display 120 is a display formed of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the communication terminal 10. In addition, a non-volatile memory that reads or writes data under control of the CPU 101 is not limited to the flash memory 104, and an electrically erasable and programmable read-only memory (EEPROM) may be used instead. Further, the terminal control program may be recorded in a file in a format installable or executable on a computer-readable recording medium such as the recording medium 106 for distribution In addition, the terminal control program may be stored on the ROM 102, instead of the flash memory 104.

Figure 4:
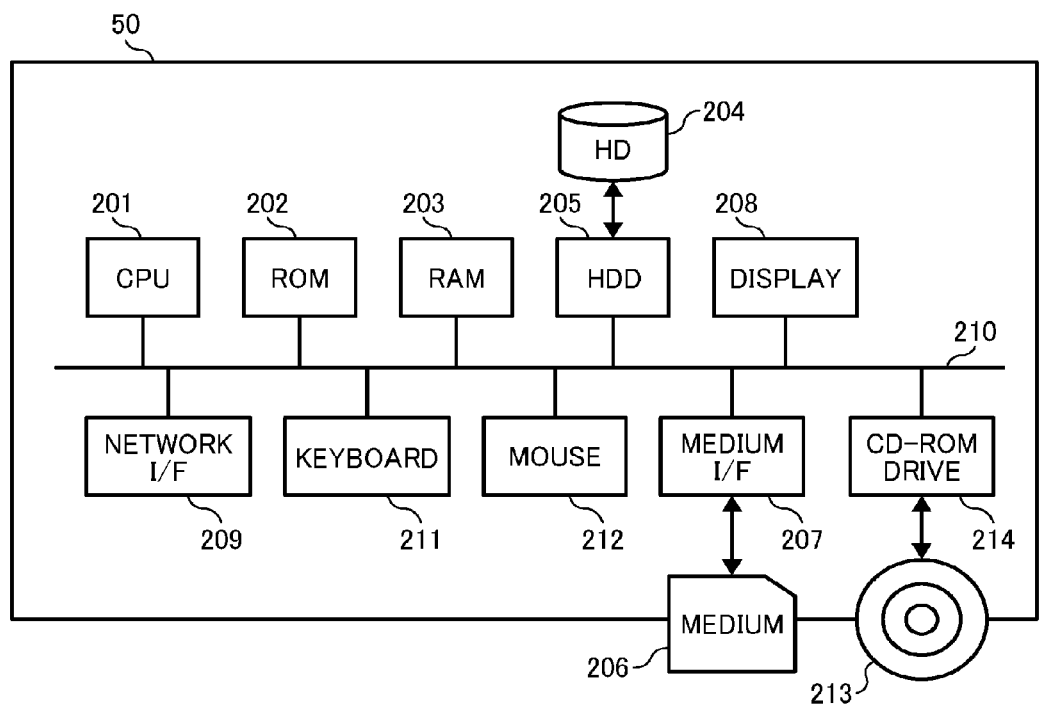
FIG. 4 is a schematic block diagram illustrating a hardware configuration of a communication management system of the communication system of FIG. 1.
Figure 6:
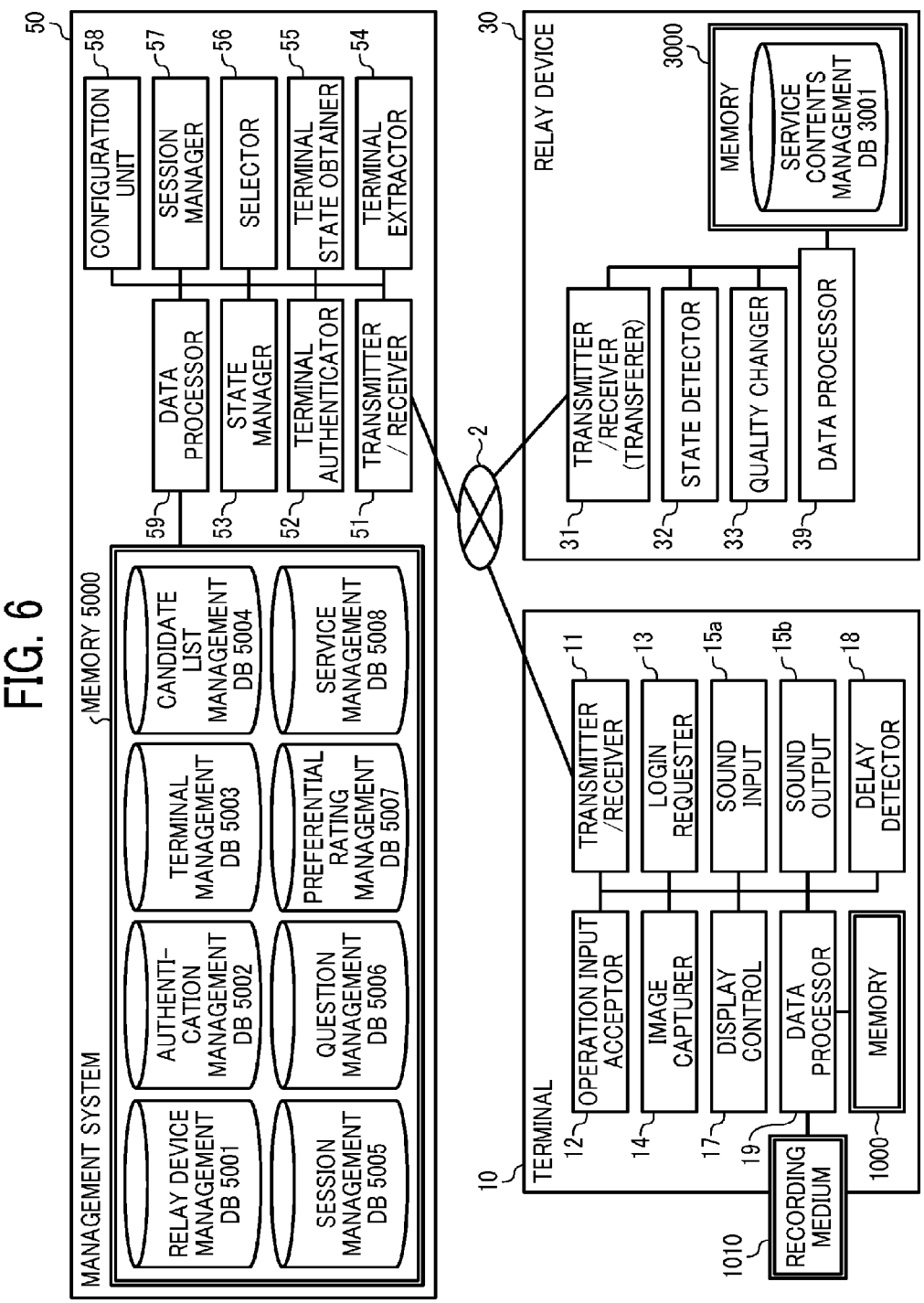
FIG. 6 is a schematic block diagram illustrating a functional configuration of the communication system of FIG. 1 according to an embodiment of the present invention.

FIG. 4 is a diagram illustrating a hardware configuration of the communication management system 50 according to the embodiment. The communication management system 50 includes a CPU 201 that controls entire operation of the communication management system 50, a ROM 202 that stores a program for operating the CPU 201, such as an IPL, a RAM 203 used as a work area for the CPU 201, the HD 204, which stores various types of data, such as the communication management program, a hard disk drive (HDD) 205 that controls reading/writing of various types of data from/to the HD 204 under control of the CPU 201, a medium I/F 207 that controls reading/writing (storage) of data from/to a recording medium 206 such as a flash memory, a display 208 that displays various types of information such as a cursor, a menu, a window, characters, or an image, a network IF 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements, as illustrated in FIG. 6.

Note that the communication management program may be recorded in a file in a format installable or executable on a computer-readable recording medium such as the recording medium 206 or the CD-ROM 213 for distribution. In addition, the communication management program may be stored on the ROM 202, instead of the HID 204.

Other examples of the removable recording medium include a computer-readable recording medium such as a compact disc recordable (CD-R), a digital versatile disk (DVD), and a Blue-ray disk.

Since the relay device 30 has a hardware configuration that is the same as or similar to that of the above-described communication management system 50, descriptions thereof are omitted. In case of the relay device 30, the HD 204 stores a relay device control program in alternative to the communication management program.

<Configuration of Communication System>

Figure 5:
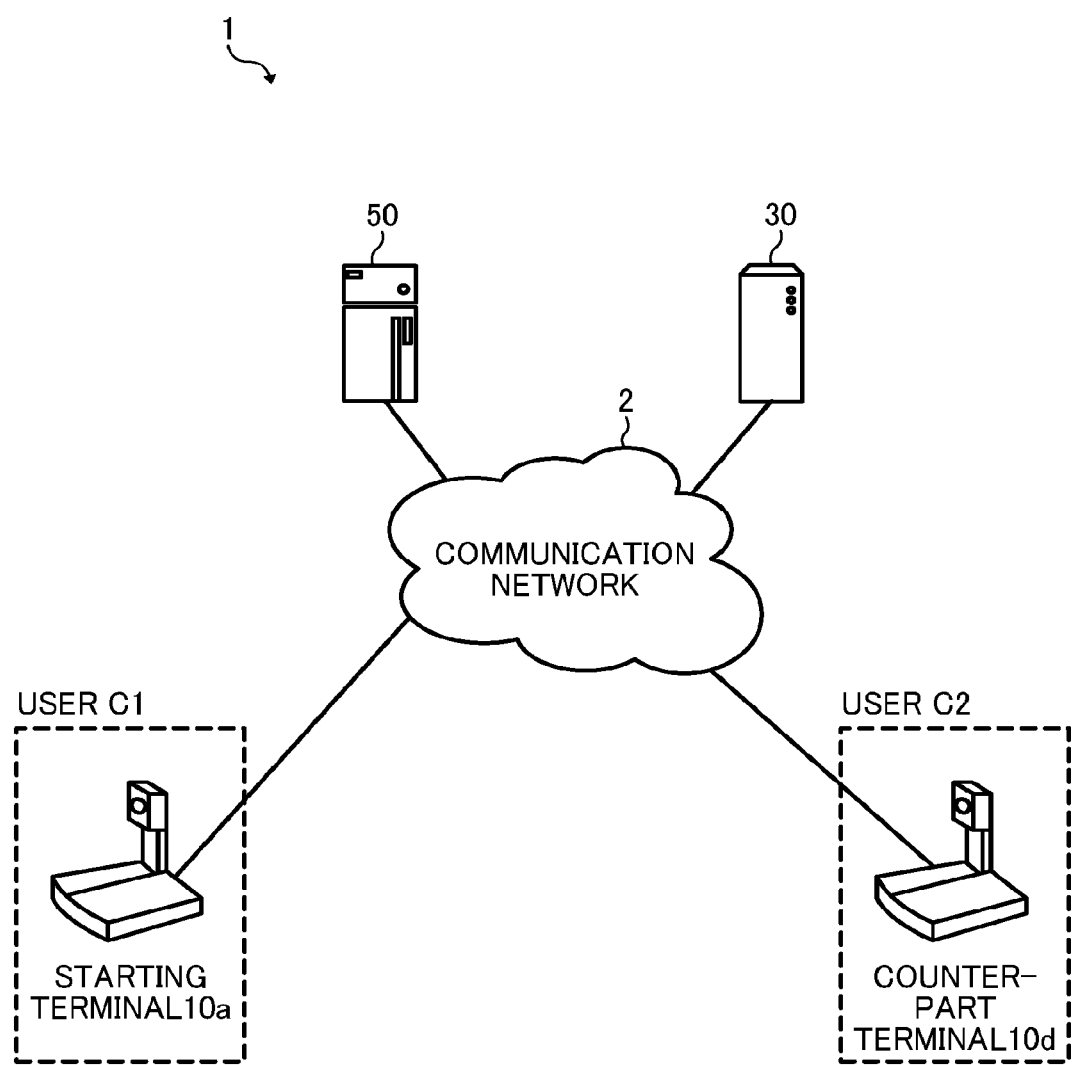
FIG. 5 is a schematic diagram illustrating the communication system of FIG. 1.

Referring now to FIG. 5, a configuration of the communication system 1 is explained according to the embodiment. FIG. 5 is a schematic diagram illustrating the communication system 1 of FIG. 1.

In FIG. 5, the starting terminal 10a, the counterpart terminal 10d, the relay device 30, and the communication management system 50 are connected to the communication network 2 including the Internet. The communication network 2 may include wireless network, in addition to wired network. The communication terminal 10a is operated by a user C1, and the communication terminal 10d is operated by a user C2. The communication management system 50 provides the communication terminal 10 with various services as described below.

<Functional Configuration of Communication System>

Next, a functional configuration of the communication system 1 is explained according to the embodiment. FIG. 6 is a schematic block diagram illustrating a functional configuration of the terminal, device, and system in the communication system 1 according to the embodiment. In FIG. 6, the communication terminal 10, the relay device 30, and the communication management system 50 are connected with one another to transmit or receive data via the communication network 2. In the following, for simplicity, the communication terminal 10 may simply be referred to as the terminal 10, and the communication management system 50 may simply be referred to as the management system 50. Further, in the following, it is assumed that a plurality of terminals 10aa, 10ab, . . . 10ba, 10bb . . . , 10ca, 10cb . . . , 10da, 10db . . . is provided in the communication system 1 of FIG. 1.

<Functional Configuration of Terminal>

The terminal 10 includes a transmitter/receiver 11, an operation input acceptor 12, a login requester 13, an image capturer 14, a sound input 15a, a sound output 15b, a display control 17, a delay detector 18, and a data processor 19. These units are functions that are implemented by operating any of the elements illustrated in FIG. 3 in cooperation with the instructions of the CPU 101 according to the terminal control program expanded from the flash memory 104 to the RAM 103. The terminal 10 further includes a memory 1000 configured by the RAM 103 illustrated in FIG. 3, and the flash memory 104 illustrated in FIG. 3. The terminal 10 is inserted with a recording medium 1010, which is implemented by the recording medium 106 illustrated in FIG. 3. The data processor 19 reads or writes various data from or to the recording medium 1010.

Referring to FIGS. 3 and 6, a functional configuration of the terminal 10 is explained in detail. In the following description of functional configuration of the terminal 10, relationships of the elements in FIG. 3 with the functional configuration of the terminal 10 in FIG. 6 will also be described.

The transmitter/receiver 11 of the terminal 10 illustrated in FIG. 6, which may be implemented by the instructions of the CPU 101 of FIG. 3, and the network I/F 111 of FIG. 3, transmits or receives various data (or information) to the other terminal, device, or system through the communication network 2. Before starting communication with a desired counterpart terminal, the transmitter/receiver 11 starts receiving state information indicating the state of each candidate counterpart terminal, from the management system 50. The state information not only indicates the operating state of each terminal 10 (whether the terminal 10 is online or offline), but also indicates a detailed state such as whether the terminal 10 whose state is online is now capable of communicating or is currently communicating, or the user of the terminal 10 is not at the terminal 10. In addition, the state information not only indicates the operating state of each terminal 10, but also indicates various states, such as the state that the cable 120c is disconnected from the terminal 10, the state that the terminal 10 can output sounds but not images, or the state that the terminal 10 is muted. Hereinafter, the case in which the state information indicates the operating state will be described by way of example.

The operation input acceptor 12, which is implemented by the instructions of the CPU 101 illustrated in FIG. 3 and by the operation keys 108 and the power switch 109 illustrated in FIG. 3, accepts various inputs from the user. For example, when the user turns on the power switch 109 illustrated in FIG. 3, the operation input acceptor 12 illustrated in FIG. 6 accepts the power on operation and turns on the power.

The login requester 13 is implemented by the instructions of the CPU 101 illustrated in FIG. 3. In response to the power on operation, the login requester 13 causes the transmitter/receiver 11 to automatically transmit to the management system 50 via the communication network 2, login request information indicating a login request, and the current IP address of the starting terminal. In addition, when the user turns the power switch 109 from on to off, the transmitter/receiver 11 transmits to the management system 50 state information indicating that the power is to be turned off, and then the operation input acceptor 12 completely turns off the power. Accordingly, the management system 50 can detect that the power of the terminal 10 is turned from on to off.

The image capturer 14 is implemented by the instructions of the CPU 101 illustrated in FIG. 3 and by the camera 112 and the imaging element I/F 113 illustrated in FIG. 3. The image capturer 14 captures an image of a subject and outputs image data obtained by capturing the image.

The sound input 15a is implemented by the instructions of the CPU 101 illustrated in FIG. 3 and by the sound input/output I/F 116 illustrated in FIG. 3. After the sound of the user is converted to a sound signal by the microphone 114, the sound input 15a receives sound data according to this sound signal. The sound output 15b is implemented by the instructions of the CPU 101 illustrated in FIG. 3 and by the sound input/output I/F 116 illustrated in FIG. 3, and outputs the sound signal according to the sound data to the speaker 115, and the speaker 115 outputs sound.

The display control 17 is implemented by the instructions of the CPU 101 illustrated in FIG. 3 and by the display I/F 117 illustrated in FIG. 3. The display control 17 combines images of different resolutions and transmits the combined image to the display 120, as will be described later. The display control 17 also transmits information on a candidate list, received from the management system 50, to the display 120, and controls display of the candidate list on the display 120.

The delay detector 18, which is implemented by the instructions of the CPU 101 illustrated in FIG. 5, detects a delay time (ms) of image data or sound data transmitted from another terminal 10 via the relay device 30.

The data processor 19, which is implemented by the instructions of the CPU 101 illustrated in FIG. 3 and by the SSD 105 illustrated in FIG. 3, or by the instructions of the CPU 101, performs processing to store various types of data in the memory 1000 or to read various types of data stored in the memory 1000. The memory 1000 stores a terminal identification (ID) for identifying the terminal 10, a password, and the like. Further, every time image data and sound data are received in performing communication with a counterpart terminal, the memory 1000 overwrites the image data and sound data. The image data before being overwritten for display on the display 120 as an image, and sound data before being overwritten is output from the speaker 115 as sounds.

Note that a terminal ID, a later-described relay device ID, and a later-described service ID in the embodiment are examples of identification information that is used to uniquely identify a specific terminal 10, a specific relay device 30, and a specific service, such that a language, a character(s), a symbol(s), or various marks are not limited to the above-described embodiment. For example, a combination of at least two of the above-mentioned language, character(s), symbol(s), and various marks may be used as a terminal ID a relay device ID, and a service ID.

Instead of a terminal ID, a user ID for identifying the user at the terminal 10 may be used. In such case, terminal identification information includes not only the terminal ID, but also the user ID.

<Functional Configuration of Relay Device>

The relay device 30 includes a transmitter/receiver 31, a state detector 32, a quality changer 33, and a data processor 39. These units are functions that are implemented by or that are caused to function by operating any of the elements illustrated in FIG. 4 in cooperation with the instructions of the CPU 201 according to the relay device control program expanded from the HD 204 to the RAM 203. The relay device 30 also includes a memory 3000 configured by the RAM 203 illustrated in FIG. 4 and/or the HD 204 illustrated in FIG. 4.

(Service Contents Management Table)

The memory 3000 stores a service contents management database (DB) 3001, such as a service contents management table of FIG. 8. The service contents management table stores, for each session to be used for communication among the plurality of terminals 10, a session ID for identifying the session, service contents, and IP addresses of the terminals 10 that are communicating through that session in association with one another. As an example of service contents, various operating parameters for controlling operation of the relay device 30 are stored as illustrated in FIG. 8. The operating parameters used in this embodiment are those parameters that affect quality of image data and/or quality of sound data to be received at the terminal 10. For example, the operating parameters include image quality parameters such as an image frame rate (frame per second), an image resolution, an image bit rate (kilobits per second), an encoding format, and color depth of image. The higher the parameter, the better the image quality, and thus the better the service contents provided by the provider at the management system 50. The operating parameters may additionally or alternatively include sound quality parameters such as a sampling rate, a bit rate, and a quantization bit rate. The higher the parameter, the better the sound quality, and thus the better the service contents provided by the provider at the management system 50. The relay device 30 refers to the service contents management table of FIG. 8 to change quality of image data and quality of sound data that are received from the terminal 10 according to the service contents.

(Functional Configuration of Relay Device)

Next, functional configuration of the relay device 30 will be described in detail. In the following description of functional configuration of the relay device 30, relationships of the elements in FIG. 4 with the functional configuration of the relay device 30 in FIG. 6 will also be described.

The transmitter/receiver 31 of the relay device 30 illustrated in FIG. 6, which is implemented by the instructions of the CPU 201 illustrated in FIG. 4 and by the network I/F 209 illustrated in FIG. 4, transmits or receives various types of data (or information) to or from another terminal, device, or system via the communication network 2. The transmitter/receiver 31 also serves as a transferer, which transfers image data and sound data transmitted from one communication terminal 10 to the other communication terminal 10.

The state detector 32, which is implemented by the instructions of the CPU 201 illustrated in FIG. 4, detects the operating state of the relay device 30 provided with the state detector 32. The possible operating states are "online", "offline", "communicating", and "interrupted".

The quality changer 33, which is implemented by the instructions of the CPU 201 illustrated in FIG. 4, refers to a service ID in the service contents management table (see FIG. 8), and changes the quality of image data and the quality of sound data according to the image quality parameter and the sound quality parameter.

The data processor 39, which is implemented by the instructions of the CPU 201 illustrated in FIG. 6 and the HDD 205 illustrated in FIG. 6, performs processing to store various types of data in the memory 3000 or read various types of data stored in the memory 3000.

<Functional Configuration of Management System>

The management system 50 includes a data transmitter/receiver 51, a terminal authenticator 52, a state manager 53, a terminal extractor 54, a terminal state obtainer 55, a selector 56, a session manager 57, a configuration unit 58, and a data processor 59. These units are functions that are implemented by or that are caused to function by operating any of the elements illustrated in FIG. 4 in cooperation with the instructions of the CPU 201 according to the management system program expanded from the HD 204 to the RAM 203. In addition, the management system 50 includes a memory 5000 configured by the HD 204 illustrated in FIG. 4.

(Relay Device Management Table)

The memory 5000 stores a relay device management DB 5001 configured by a relay device management table such as that illustrated in FIG. 10. The relay device management table stores, for each one of the relay devices 30 managed by the management system 50, the relay device ID, the operating state of the relay device 30, the date/time received at which state information indicating the operating state is received at the management system 50, the IP address of the relay device 30, and the maximum data transfer rate (Mbps) of the relay device 30, in association with one another. For example, the relay device management table illustrated in FIG. 10 indicates that the relay device 30*a* with the relay device ID "111a" has the operating state "online", the date/time received at which state information is received by the management system 50 "Apr. 10, 2014, 13:00", the IP address "1.2.1.2", and the maximum data transfer rate "100 Mbps".

(Authentication Management Table)

The memory 5000 further stores an authentication management DB 5002 configured by an authentication management table such as that illustrated in FIG. 11. In the authentication management table, for each one of the terminals 10 managed by the management system 50, the terminal ID and the password are stored in association with each other. For example, the authentication management table illustrated in FIG. 11 indicates that the terminal ID of the terminal 10*aa* is "01aa", and the password of the terminal 10*aa* is "aaaa".

(Terminal Management Table)

The memory 5000 also stores a terminal management DB 5003 configured by a terminal management table such as that illustrated in FIG. 12. The terminal management table stores, for each one of the terminals 10 managed by the management system 50, the terminal ID of the terminal 10, a counterpart terminal name in the case where the terminal 10 serves as a counterpart terminal, the operating state of the terminal 10, a date/time received at which login request information described later is received at the management system 50, the IP address of the terminal 10, and the service ID of the service to be provided to the terminal 10, in association with one another. For example, the terminal management table illustrated in FIG. 12 indicates that the terminal 10*aa* with the terminal ID "01aa" has the counterpart terminal name "AA terminal, Tokyo office, Japan", the operating state "online (communication OK)", the date/time received at which login request information is received by the management system 50 "Apr. 10, 2014, 13:40", the IP address "1.2.1.3" and the service with the service ID "sv103" is provided.

(Candidate List Management Table)

The memory 5000 further stores a candidate list management DB 5004 configured by a candidate list management table such as that illustrated in FIG. 13. The candidate list management table stores, for each one of the terminals 10 managed by the management system 50, the terminal ID of the terminal 10 (starting terminal) that requests to start communication, in association with the terminal IDs of all counterpart terminals 10 registered as candidate counterpart terminals for the terminal 10. For example, the candidate list management table illustrated in FIG. 13 indicates that candidates for a counterpart terminal to which a starting terminal (terminal 10*aa*) whose terminal ID is "01aa" can send a request to start communication in a videoconference are the terminal 10*ab* whose terminal ID is "01ab", the terminal 10*ba* whose terminal ID is "01ba", the terminal 10*bb* whose terminal ID is "01bb", and so forth. The candidate counterpart terminals are updated by addition or deletion in response to an addition or deletion request received from an arbitrary starting terminal to the management system 50.

(Session Management Table)

The memory 5000 also stores a session management DB 5005 configured by a session management table such as that illustrated in FIG. 14. The session management table stores, for each session ID of a session to be used for communication, the relay device ID of a relay device 30 used in relaying image data and sound data, the terminal ID of a starting terminal, the terminal ID of a counterpart terminal, a delay time (ms) in receiving image data at the counterpart terminal, and a received date/time at which delay information indicating this delay time is transmitted from the counterpart terminal and received by the management system 50 in association with one another. The session ID in the session management table is the same as the session ID in the service contents management table of FIG. 8. For example, referring to FIG. 14, through the session with the session ID "sel", two terminals (10aa, 10db) are communicated with each other via the relay device 30d.

(Question Management Table)

The memory 5000 further stores a question management DB 5006, which is implemented by a question management table such as that illustrated in FIG. 15. The question management table stores, for each one of questions that are previously prepared, a question ID for identifying the question, contents of the question, and options that can be selected as an answer to that question, in association with one another. For example, the question management table of FIG. 15 previously stores a set of questions that are previously determined by the service provider (such as the administrator at the management system 50), which would be helpful to determine the operating parameter that is suitable in providing a specific service to the user. For example, the service provider may prepare the question "How much degree will an object move, when capturing the object for display?", to see if the image with a higher frame rate is desirable to match the user need. In such case, the question management table of FIG. 15 stores, for a question with the question ID "q001", the question contents "How much degree will an object move, when capturing the object for display?", and the options that are previously prepared. In this example, the operations include: Option 1 "The entire object is constantly moving", Option 2 "A part of the object is constantly moving", and Option 3 "The object rarely moves". Based on selection of one of the options 1, 2, and 3, the operating parameter for controlling the image quality, such as the frame rate, may be determined. Further, in this embodiment, a service to be provided to the user not only includes various services provided by the management system 50, but also various services provided by a third party.

(Preferential Rating Management Table)

The memory 5000 further stores a preferential rating management DB 5006 configured by a preferential rating management table such as that illustrated in FIG. 16. The preferential rating management table manages a preferential rating to be used for determining services to be recommended to the terminal 10, for each one of the questions identified with the question ID. Specifically, the preferential rating management table stores, for each one of the options prepared for each question, the service ID of a specific service that is available in association with preferential rating information indicating a preferential rating in using that specific service. That is, the preferential rating management table stores, for each of the services that are available, the service ID and the preferential rating information indicating the preferential rating in using that service that is previously determined for each one of the options (or each one of the numerals reflecting the options).

For example, for the question "How much degree will an object move, when capturing the object for display?" with the questions ID "q001", it is desirable to provide a service capable of providing an image at a higher frame rate, if the Option 1 "The entire object is constantly moving" is selected. Accordingly, services capable of providing the higher frame rate image are assigned with higher points, such as service with the service ID "sv101" having 10 points. In contrast, services not capable of providing the higher frame rate image are assigned with lower points, such as service with the service ID "sv103" having −5 points. Further, for the service with the service ID "sv101", the preferential rating is set at high for the Option 1, compared to the preferential rating for the other Option 2 or 3. In a substantially similar manner, the preferential rating information is previously determined for each question, for each service.

In determining a service to be recommended to the user, for each service, the points that are obtained for all questions are added to obtain the total preferential rating of that service. The service having the highest total preferential rating is selected as a service to be recommended to the user at the terminal 10 that answers the questions. In this example, the numeral is assigned to each option as an example of identification of each option, but any other information may be used as identification of each option.

(Service Management Table)

The memory 5000 further stores a service management DB 5007 configured by a service management table such as that illustrated in FIG. 17. The service management table manages, for each service of the services that can be provided by the management system 50, a service ID of the service in association with service contents and a usage fee of that service. Since the service contents in the service management table are the same as the frame rate, resolution, bit rate, and encoding format that are managed in the service contents management table (see FIG. 8), descriptions thereof will be omitted. The usage fee is an amount of fee that is charged to a user of the service, by a service provider of the service. The service provider in this example may be an administrator of the management system 50 or a user of the management system 50. The usage fee is stored in association with the service ID of each service. For example, the service provider may charge the user with higher usage fees, as quality of image data and sound data become higher (that is, when the service contents are high-standard). For example, for the service providing high-quality image data, such as, with higher resolution or higher frame rate, such service will be charged at higher usage fees.

Note that information regarding the service contents in the service management table (see FIG. 17) are, for example, operating parameters and usage fee set by the service provider at the management system 50. As described below referring to S85, the management system 50 transmits information regarding the service contents, obtained from the service contents management table of FIG. 17 to the relay device 30. The relay device 30 then stores the information regarding the service contents in the service contents management table of FIG. 8.

(Functional Configuration of Management System)

Next, referring back to FIG. 6, functional configuration of the management system 50 will be described in detail. In the following description of functional configuration of the management system 50, relationships of the elements in FIG. 4 with functional configuration of the management system 50 in FIG. 6 will also be described.

The transmitter/receiver 51, which is implemented by the instructions of the CPU 201 illustrated in FIG. 4 and by the network I/F 209 illustrated in FIG. 4, and transmits or receives various types of data (or information) to or from another terminal, device, or system via the communication network 2.

The terminal authenticator 52, which is implemented by the instructions of the CPU 201 illustrated in FIG. 4, performs terminal authentication by searching the authentication management DB 5002 of the memory 5000 by using a terminal ID and a password included in login request information received via the data transmitter/receiver 51 as search keys and determining whether the same pair of a terminal ID and a password is managed in the authentication management DB 5002.

The state manager 53 is implemented by the instructions of the CPU 201 illustrated in FIG. 4. In order to manage the operating state of a starting terminal that has sent a login request, the state manager 53 stores the terminal ID of the starting terminal, the operating state of the starting terminal, the date/time received at which login request information is received by the management system 50, and the IP address of the starting terminal in association with one another in the terminal management DB 5003 (see FIG. 12). In addition, in response to receiving state information sent from the terminal 10 indicating that power is to be turned off when the user turns the power switch 109 of the terminal 10 from on to off, the state manager 53 changes the operating state indicating an online state to an offline state in the terminal management DB 5003 (see FIG. 12).

The terminal extractor 54, which is implemented by the instructions of the CPU 201 illustrated in FIG. 4, searches the candidate list management DB 5004 (see FIG. 13) by using the terminal ID of a starting terminal that has sent a login request as a key, and reads the terminal ID of a candidate counterpart terminal that can communicate with the starting terminal, thereby extracting the terminal ID. The terminal extractor 54 also searches the candidate list management DB 5004 (see FIG. 13) by using the terminal ID of a starting terminal that has sent a login request as a key, and extracts the terminal ID of another starting terminal that has the terminal ID of the former-mentioned starting terminal registered as a candidate for a counterpart terminal.

The terminal state obtainer 55, which is implemented by the instructions of the CPU 201 illustrated in FIG. 4, searches the terminal management DB 5003 (see FIG. 12) by using the terminal ID of a candidate counterpart terminal, extracted by the terminal extractor 54, as a search key, and reads the operating state for each terminal ID extracted by the terminal extractor 54. Accordingly, the terminal state obtainer 55 can obtain the operating state of a candidate counterpart terminal that can communicate with a starting terminal that has sent a login request. The terminal state obtainer 55 also searches the terminal management DB 5003 by using the terminal ID extracted by the terminal extractor 54 as a search key, and obtains the operating state of a starting terminal that has sent a login request.

Figure 7:
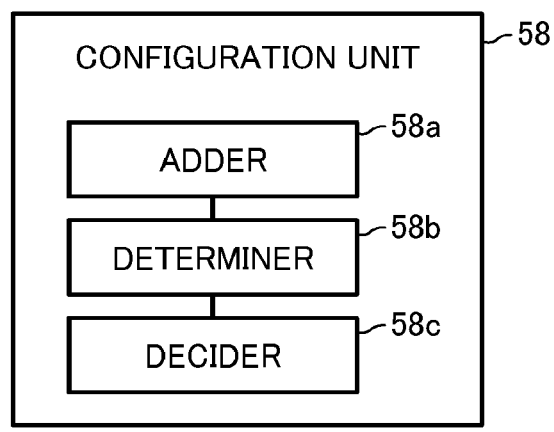
FIG. 7 is a schematic block diagram illustrating a functional configuration of a selector of the communication management system of FIG. 6.

The configuration unit 58, which is implemented by the instructions of the CPU 201 illustrated in FIG. 4, configures a service to be provided to the terminal 10 based on the option that is selected at the terminal 10 as an answer to the question. Specifically, the configuration unit 58 stores the service ID of the service to be provided to the terminal 10, in the "service ID" field of a record for that terminal 10 in the terminal management table (See FIG. 12). The configuration unit 58 includes an adder 58a, a determiner 58b, and a decider 58c, which are implemented by the instructions of the CPU 201 (FIG. 4) as illustrated in FIG. 7.

The adder 58a calculates, for each one of the services, the total preferential rating by adding up the points for all questions using the preferential rating management table (FIG. 16). Operation of calculating the total preferential rating is explained later.

The determiner 58b determines whether the points are added for all questions.

The decider 58b decides the service having the highest total preferring rating, as a service to be recommended to the terminal 10.

<Operation>

Figure 9:
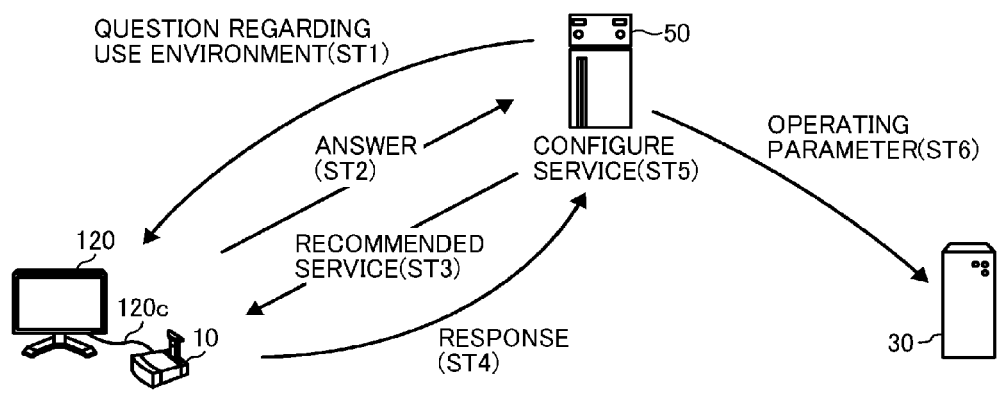
FIG. 9 is an illustration for explaining operation of setting operating parameters in providing a recommended service, performed by the communication system of FIG. 6, according to an embodiment of the present invention.

Referring to FIG. 9, example operation of deter mining a service to be provided to the terminal 10 is explained according to the embodiment. FIG. 9 is a schematic diagram illustrating operation performed by the communication system 1.

As illustrated in FIG. 9, in this embodiment, the management system 50 transmits a questionnaire regarding the use environment of the terminal 10, to the terminal 10 (ST1). The management system 50 receives an answer to the questionnaire from the terminal 10 (ST2). The management system 50 transmits a recommended service to the terminal 10, which is determined based on the answer from the terminal 10 (ST3). The management system 50 receives a response indicating whether to accept or not accept the recommended service, from the terminal 10 (ST4). When the response accepting the recommended service is received, the management system 50 configures the recommended service as a service to be provided to the terminal 10 (ST5). The management system 50 transmits to the relay device 30, operating parameters of the relay device 30 in providing the configured service (ST6).

Figure 18:
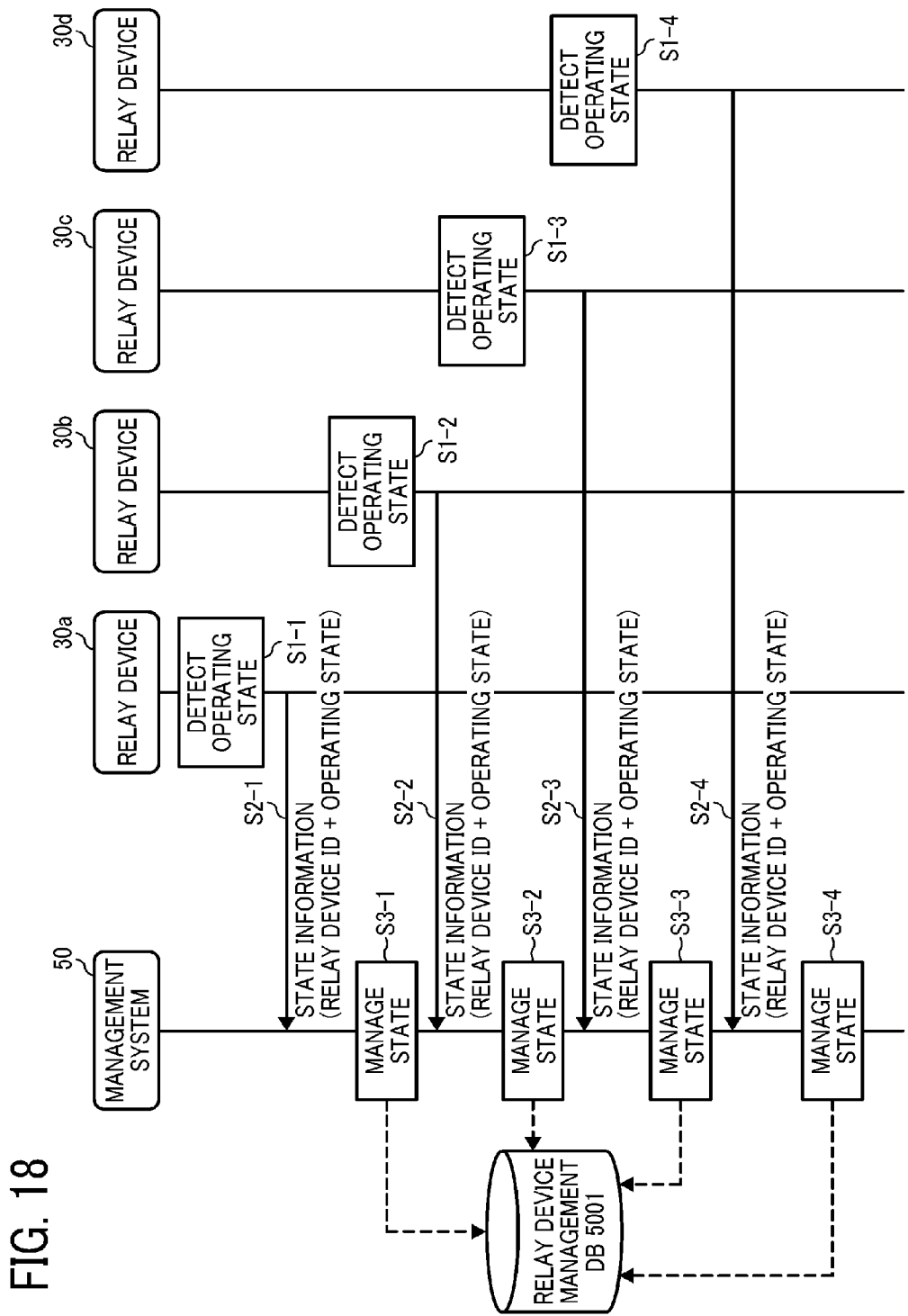
FIG. 18 is a data sequence diagram illustrating operation of managing state information indicating an operating state of a relay device, according to an embodiment of the present invention.

Referring now to FIGS. 18 to 26, operation performed by the communication system 1 is explained according to an embodiment of the present invention. FIG. 18 is a data sequence diagram illustrating operation of managing an operating state of each of the relay devices 30, performed by the management system 50.

First, operation of managing state information, transmitted from each relay device 30 to the management system 50, indicating the state of the relay device 30 will be described using FIG. 18. At each relay device 30, the state detector 32 illustrated in FIG. 6 periodically detects the operating state of the relay device 30 (steps S1-1 to S1-4). In order to cause the management system 50 to manage the operating state of the relay device 30 in real time, the data transmitter/receiver 31 of each relay device 30 periodically transmits its state information to the management system 50 via the communication network 2 (step S2-1 to S2-4). The state information includes the relay device ID of the relay device 30, and the operating state detected by the state detector 32 of the relay device 30. Note that the embodiment discusses the case where, while the relay devices (30a, 30b, and 30d) are normally operating and are "online", the relay device 30c, which is operating, is "offline" since some sort of failure has occurred in a program for executing a relay operation of the relay device 30c.

Next, in the management system 50, the data transmitter/receiver 51 receives the state information transmitted from each relay device 30, and stores and manages the state information according to each relay device ID in the relay device management DB 5001 (see FIG. 11) of the memory 5000 via the data processor 59 (steps S3-1 to S3-4). Accordingly, in the relay device management table such as that illustrated in FIG. 11, one of the operating states "online", "offline", and "out of order" is stored and managed according to each relay device ID. In this case, for each relay device ID, the date/time received at which the state information is received by the management system 50 is additionally stored. In the case where no state information is sent from a relay device 30, an operating state field and a date/time received field in each record in the relay device management table illustrated in FIG. 11 become blank, or the previous operating state and the date/time received at which the previous operating state is received are shown.

Figure 19:
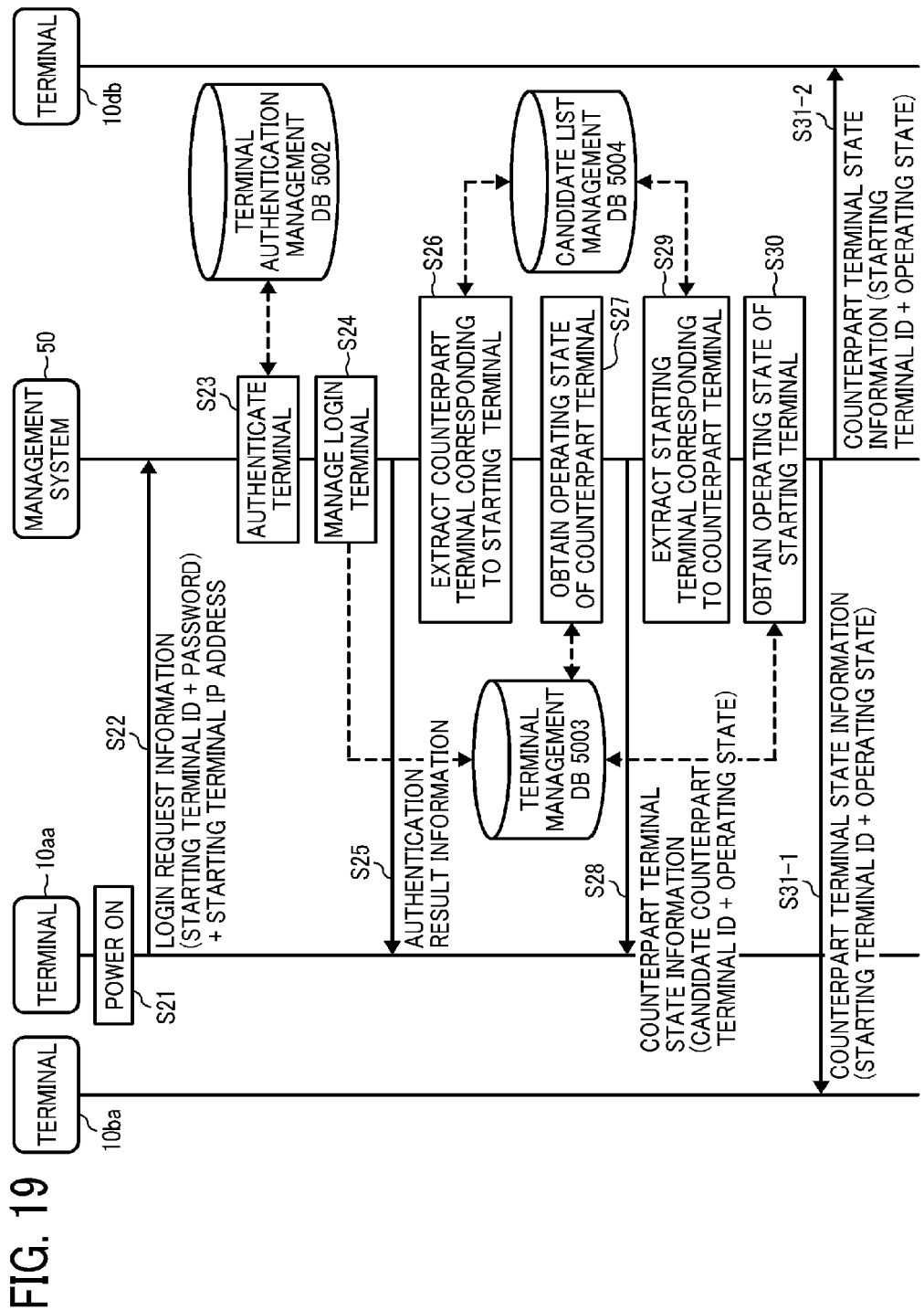
FIG. 19 is a data sequence diagram illustrating operation of preparing for starting communication between remotely located sites, according to an embodiment of the present invention.

Next, operation of transmitting or receiving each item of management data at a preparation step before starting communication among three places, namely, the terminal 10aa, the terminal 10ba, and the terminal 10db, will be described using FIG. 19. FIG. 19 is a data sequence diagram illustrating operation of preparing for starting communication between the terminals 10. In FIG. 19, various items of management data are entirely transmitted or received by the management data session sei illustrated in FIG. 1.

When the user of a starting terminal (terminal 10aa) turns on the power switch 109 illustrated in FIG. 2, the operation input acceptor 12 illustrated in FIG. 6 accepts the power on operation and turns on the power (step S21). In response to acceptance of the power on operation, the login requester 13 automatically transmits login request information indicating a login request from the data transmitter/receiver 11 to the management system 50 via the communication network 2 (step S22). Note that the login request information may be transmitted in response to operation of the operation keys 108 by the user, instead of turning on of the power switch 109. The login request information includes a terminal ID for identifying the terminal 10aa, which is a local terminal serving as a starting terminal that may start communication, and a password. The terminal ID and the password are data that have been read via the data processor 19 from the memory 1000 and sent to the data transmitter/receiver 11. Alternatively, the terminal ID and the password may be recorded on the recording medium 1010 and may be read out from the recording medium 1010. In the case of transmitting login request information from the terminal 10aa to the management system 50, the management system 50, which is a receiving side, can detect the IP address of the terminal 10aa, which is a transmitting side.

Next, the terminal authenticator 52 of the management system 50 performs terminal authentication by searching the authentication management DB 5002 (see FIG. 11) of the memory 5000 by using the terminal ID and the password included in the login request information received via the data transmitter/receiver 51 as search keys, and determining whether the same terminal ID and the same password are managed in the authentication management DB 5002 (step S23). In the case where the terminal authenticator 52 determines that the login request is a login request received from a terminal 10 that has a legitimate use authority since the same terminal ID and the same password are managed, the state manager 53 stores, in the terminal management DB 5003 (see FIG. 12), the terminal ID of the terminal 10aa, the operating state, the date/time received at which the above-described login request information is received, and the IP address of the terminal 10aa in association with one another (step S24). Accordingly, the operating state "online", the date/time received "4.10.2014.13:40", and the IP address "1.2.1.3" of the terminal 10aa are managed in association with the terminal ID "01aa" in the terminal management table illustrated in FIG. 12.

The data transmitter/receiver 51 of the management system 50 transmits authentication result information indicating an authentication result obtained by the terminal authenticator 52 to the starting terminal (terminal 10aa) which has sent the above-mentioned login request, via the communication network 2 (step S25). In the embodiment, the case in which it has been determined by the terminal authenticator 52 that the terminal 10aa is a terminal that has a legitimate use authority will be described as follows.

The terminal extractor 54 of the management system 50 searches the candidate list management DB 5004 (see FIG. 13) by using the terminal ID "01aa" of the starting terminal (terminal 10aa) which has sent the login request as a search key, and reads out and thereby extracts the terminal ID of a candidate counterpart terminal that can communicate with the starting terminal (terminal 10aa) (step S26). Here, for example, the terminal IDs ("01ab", "01ba", and "01db") of counterpart terminals (terminals 10ab, 10ba, and 10db) corresponding to the terminal ID "01aa" of the starting terminal (terminal 10aa) are extracted.

Next, the terminal state obtainer 55 searches the terminal management DB 5003 (see FIG. 12) by using the terminal IDs ("01ab", "01ba", and "01db") of the counterpart terminals, which are extracted by the terminal extractor 54, as search keys, and reads corresponding operating states for the individual terminal IDs extracted by the terminal extractor 54, thereby obtaining the operating states of the terminals (10ab, 10ba, and 10db) (step S27). Next, the transmitter/receiver 51 transmits counterpart terminal state information including the terminal IDs ("01ab", "01ba", and "01db") serving as the search keys used in step S27 described above and the operating states ("offline", "online", and "online") of the counterpart terminals (terminals 10ab, 10ba, and 10db) corresponding to these terminal IDs to the starting terminal (terminal 10aa) via the communication network 2 (step S28). In doing so, the starting terminal (terminal 10aa) can obtain the current operating states ("offline", "online", and "online") of the terminals (10ab, 10ba, and 10db) that are candidates for a counterpart terminal that can communicate with the starting terminal (terminal 10aa).

The terminal extractor 54 of the management system 50 further searches the candidate list management DB 5004 (see FIG. 13) by using the terminal ID "01aa" of the starting terminal (terminal 10aa) which has sent the login request as a search key, thereby extracting the terminal ID of another starting terminal that registers the terminal ID "01aa" of the above-mentioned starting terminal (terminal 10aa) as a candidate for a counterpart terminal (step S29). In the candidate list management table illustrated in FIG. 13, the terminal IDs of other starting terminals that are extracted are "01ab", "01ba", and "01db".

Next, the terminal state obtainer 55 of the management system 50 searches the terminal management DB 5003 (see FIG. 12) by using the terminal ID "01aa" of the starting terminal (terminal 10aa) which has sent the login request as a search key, and obtains the operating state of the starting terminal (terminal 10aa) which has sent the login request (step S30).

The transmitter/receiver 51 transmits counterpart terminal state information including the terminal ID "01aa" and the operating state "online" of the starting terminal (terminal 10aa), obtained at S30, to terminals (10ba and 10db) whose operating states are "online" in the terminal management DB 5003 (see FIG. 12), among the terminals (10ab, 10ba, and 10db) according to the terminal IDs ("01ab", "01ba", and "01db") extracted at S29 (steps S31-1 and S31-2). When transmitting the counterpart terminal state information to the terminals (10ba and 10db), the transmitter/receiver 51 refers to the IP addresses of the terminals, which are managed in the terminal management table illustrated in FIG. 12, on the basis of the terminal IDs ("01ba" and "01db"). Accordingly, the terminal ID "01aa" and the operating state "online" of the starting terminal (terminal 10aa) which has sent the login request can be transmitted to other counterpart terminals (terminals 10db and 10ba) that can communicate with the starting terminal (terminal 10aa).

For any other terminal 10, as described above referring to S21, when the user turns on the power switch 109 illustrated in FIG. 4, the operation input acceptor 12 illustrated in FIG. 6 accepts the power on operation and performs processing that is the same as or similar to the above-described S22 to S31-1 and S31-2, such that descriptions of which are omitted.

Figure 20:
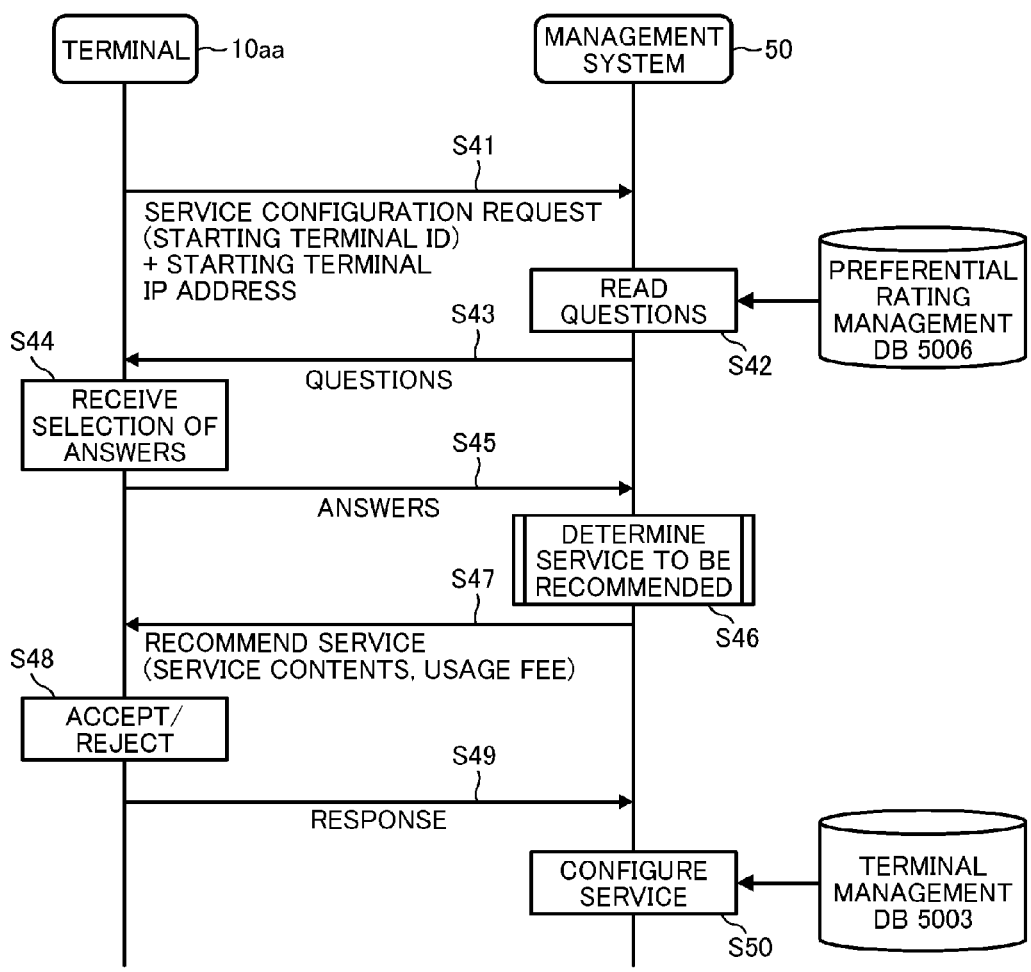
FIG. 20 is a data sequence diagram illustrating operation of configuring operating parameters relating to a service, according to an embodiment of the present invention.

Referring to FIG. 20, operation of configuring operation parameters to be used by the management system 50 in providing a service to the terminal 10 is explained according to an embodiment of the present invention. FIG. 20 is a data sequence diagram illustrating operation of configuring operating parameters related to a service. The example of FIG. 20 assumes that the management system 50 configures a service to be provided to the terminal 10aa.

As illustrated in FIG. 20, the transmitter/receiver 11 of the terminal 10 transmits a service configuration request to the management system 50 (S41). The service configuration request includes the terminal ID of the terminal 10aa that serves as a starting terminal. Accordingly, the transmitter/receiver 51 of the management system 50 receives the service configuration request. The data processor of the management system 50 reads out a set of questions from the question management table (See FIG. 15) to be displayed as a questionnaire (S42). The transmitter/receiver 51 of the management system 50 sends the questions to the terminal 10aa (S43). The transmitter/receiver 11 of the terminal 10aa receives the questions from the management system 50.

The display control 17 of the terminal 10aa causes the display 120aa to display a screen including the questions as illustrated in FIG. 21. FIG. 21 is an example screen including contents of the questionnaire for display to the user. The screen of FIG. 21 includes a plurality of questions, a plurality of options for each question, and a plurality of radio buttons each of which is displayed at a side of the corresponding option for selection by the user at the terminal 10. As the user at the terminal 10aa selects one of the radio buttons to answer each question, the operation input acceptor 12 receives selection of each question (S44). As the user at the terminal 10aa further presses the "Send" key at the lower right side of the screen of FIG. 21 after answering all questions, the transmitter/receiver 11 of the terminal 10aa transmits the answers indicating the selected radio buttons for the respective questions to the management system 50 (S45). The answer to each question in this example includes a question ID for identifying the question, and a numeral that is selected by the user as an answer to that question, in association with each other. The transmitter/receiver 51 of the management system 50 receives the answers in response to the questionnaire.

Figure 22:
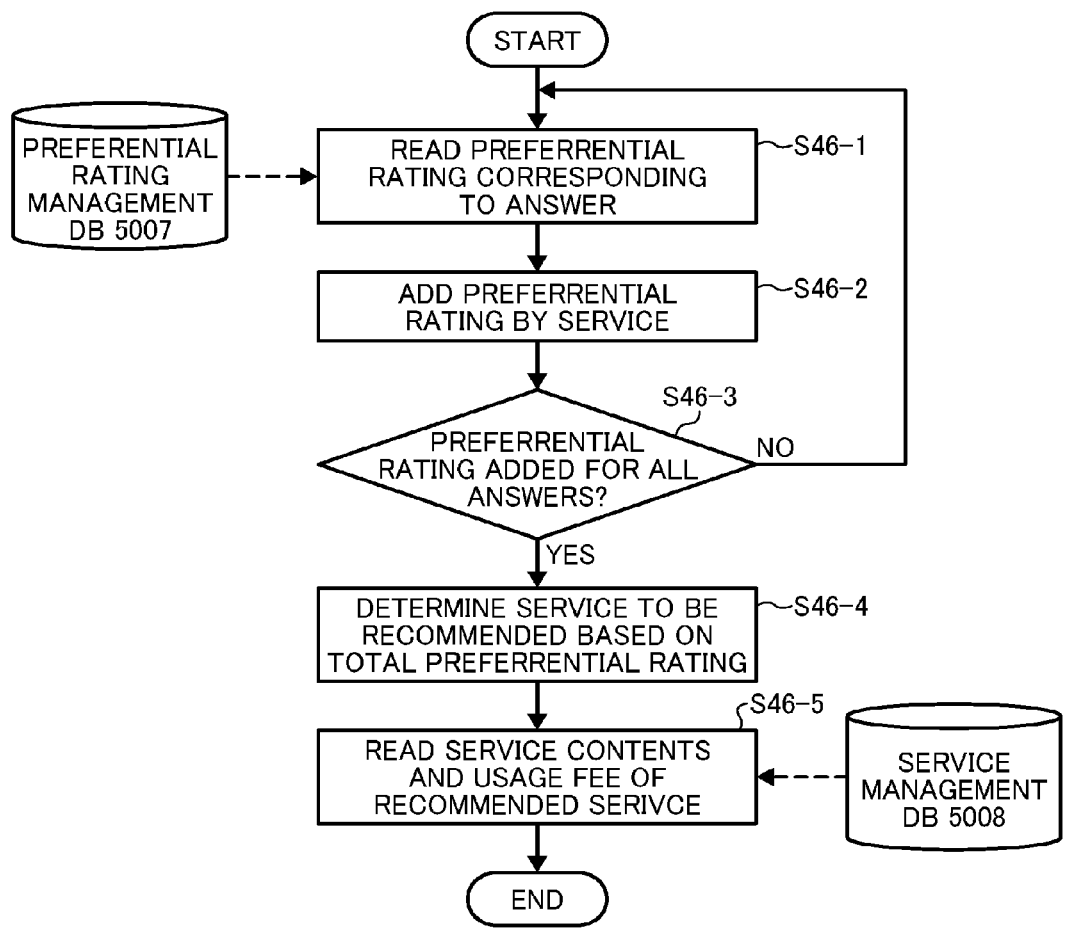
FIG. 22 is a flowchart illustrating operation of determining a service to be recommended, according to an embodiment of the present invention.

Next, the management system 50 performs operation of determining a service to be recommended to the terminal 10aa (S46). Referring to FIGS. 22 and 23, operation of S46 is explained in detail. FIG. 22 is a flowchart illustrating operation of determining a service to be recommended.

As illustrated in FIG. 22, the data processor 59 searches the preferential rating management table (See FIG. 16) using the question ID and the selected numeral (option) included in the answer for each question as a search key to obtain the preferential rating (points) of the service for each service ID for each question.

Next, the adder 58a illustrated in FIG. 7 calculates, for each one of the service IDs, the total preferential rating by adding the preferential ratings for all of the questions. Referring to FIG. 23, operation of calculating the total preferential rating is explained. FIG. 23 is a schematic diagram for explaining calculating total preferential rating.

As illustrated in FIG. 23A, it is assumed that the total preferential rating is "0" for all service IDs. For example, it is assumed that the user at the terminal 10aa selects the option "1" for the question "1" at S44, at S46-1, the data processor 59 reads out the preferential rating (points) associated with the option "1" for the question ID "q001" from the preferential rating management table (FIG. 16), for each one of the service IDs. As illustrated in FIG. 23B, the adder 58a adds the preferential rating (points) of the option "1" for the question ID "q001", as the total preferential rating of each service ID.

Next, the determiner 58b determines whether the preferential rating is added for all questions in the received answer (S46-3). When it is determined that the adder 58a has not added the preferential rating for all questions ("NO"), the operation returns to S46-1. For example, if it is assumed that the adder 58a has not added the preferential rating for the question "q002", the operation repeats S46-1. Further, in this example, it is assumed that the option "2" is selected for the question "q002". At S46-1, the data processor 59 reads out the preferential rating (points) associated with the option "2" for the question ID "q002" from the preferential rating management table (FIG. 16). At S46-2, the adder 58a adds the preferential rating (points) of the option "2" for the question "q002", to the preferential rating (points) of the option "1" for the question "q001", to obtain the total preferential rating of each service ID. Through this processing, for example, as illustrated in FIGS. 23B and 23C, the preferential rating for the currently processed question is added to the preferential rating for the previously processed question to obtain the total preferential rating of all questions.

At S46-3, when it is determined that the adder 58a has added the preferential rating for all questions ("YES" at S46-3), the operation proceeds to S46-4. The decider 58c selects the service having the highest preferential rating as a service to be recommended to the terminal 10aa (S46-4). The data processor 59 searches the service management table (FIG. 17) using the service ID of the service to be recommended, as a search key, to obtain service contents and usage fee (S46-5). As illustrated in FIG. 17, the service contents in this embodiment is defined by a frame rate, resolution, bit rate, and encoding format.

Referring back to FIG. 20, the transmitter/receiver 51 of the management system 50 transmits a confirmation request that requests whether to accept the recommended service, to the terminal 10aa (S47). The confirmation request includes the service contents and the usage fee of the recommended service. Accordingly, the transmitter/receiver 11 of the terminal 10aa receives the confirmation request.

Based on the confirmation request, the terminal 10aa may cause the display 120 to display a screen including information regarding the contents of the recommended service and the usage fee. With this information, the user at the terminal 10aa is able to determine whether to accept the recommended service.

Next, the user at the terminal 10aa selects whether to accept or not accept the recommended service, for example, based on the service contents and usage fee. In response to the user selection, the operation input acceptor 12 receives the user selection indicating whether to accept or not the recommended service (S48). The transmitter/receiver 11 of the management system 10aa transmits a response indicating whether to accept or not accept, to the management system 50 (S49). In the following, it is assumed that the user at the terminal 10aa selects to accept the recommended service.

Based on the response, the configuration unit 58 of the management system 50 stores the service ID of the recommended service, in the "service ID" field of a record for the terminal ID "01aa" of the terminal 10aa in the terminal management table (FIG. 12), to configure the service to be provided to the terminal 10aa (S50).

As described above, the management system 50 sends a questionnaire that helps to identify a service that matches the need of the user at the terminal 10, to the user at the terminal 10. For example, such questionnaire includes one or more questions regarding use environment or application of the terminal 10 by the user. The management system 50 receives an answer to that questionnaire, and selects a specific service having service contents and usage fee that match the received answer. The terminal 10 that actually receives the service from the management system 50, and the terminal 10 that is configured by the management system 50 as the terminal 10 to be provided with such service does not have to be identical, such that these terminals 10 may be separate devices.

Referring to FIG. 24, operation of selecting the relay device 30 is explained according to the embodiment. In FIG. 24, various management data is transmitted or received through the management data session "sei" in FIG. 1. Further, in this embodiment, the starting terminal (terminal 10aa) is able to start communicating with at least one of the candidate counterpart terminals 10 having the operating state "online", based on the terminal state information received at S28. The example case in which the user at the starting terminal (terminal 10aa) starts communicating with the counterpart terminal (terminal 10db) is described below.

First, when the user presses the operation keys 108 illustrated in FIG. 3 and selects the terminal 10db, the operation input acceptor 12 illustrated in FIG. 6 accepts a request for starting communication with the counterpart terminals (terminal 10db) (step S61). The transmitter/receiver 11 of the starting terminal (terminal 10aa) transmits, to the management system 50, start request information indicating a request for starting communication (step S42). The start request information includes the terminal ID "01aa" of the terminal 10aa, and the terminal ID ("01db") of the counterpart terminal (terminal 10db). The transmitter/receiver 51 of the management system 50 obtains the start request information, and further receives the IP address of the starting terminal (terminal 10aa), which is the transmission source. The service ID is read out by the data processor 19 from the recording medium 1010, and transmitted by the data transmitter/receiver 11.

On the basis of the terminal ID "01aa" of the starting terminal (terminal 10aa) and the terminal ID ("01db") of the counterpart terminal (terminal 10db), which are included in the start request information, the state manager 53 changes the operating state field of each of records including the above-mentioned terminal IDs "01aa" and "01db" to "communicating" in the terminal management table (see FIG. 12) (S63). In this state, although the starting terminal (terminal 10aa) and the counterpart terminal (terminal 10db) have not started communicating, these terminals enter a communicating state, and, if another terminal 10 tries to communicate with the starting terminal (terminal 10aa) or the counterpart terminal (terminal 10db), a notification sound or display that indicates that the terminal is communicating is output.

Next, operation of executing a session for selecting a relay device 30 to be actually used will be described. First, the session manager 57 of the management system 50 generates a session ID used in executing a session for selecting a relay device 30 (S64). Here, the session ID "sel" is generated.

In the session management table (FIG. 14), the session manager 57 stores the session ID "sel" generated at S64, the terminal ID "01aa" of the starting terminal (terminal 10aa), and the terminal ID "01db" of the counterpart terminal (terminal 10db) in association with one another (step S45).

Next, the selector 56 of the management system 50, illustrated in FIG. 7, selects a relay device 30 for relaying communication among two sites, namely, the starting terminal (terminal 10aa) and the counterpart terminal (terminal 10db), on the basis of the relay device management table (FIG. 10) and the terminal management table (FIG. 12) (S66). Specifically, the selector 56 selects, among the relay devices having the operating state "online" in the relay device management table (FIG. 10), one relay device 30 having the IP address that is close to the IP address of the starting terminal (terminal 10aa) in the terminal management table (FIG. 12). In this embodiment, it is assumed that the relay device 30aa (relay device ID "111") is selected.

After completion of selection of the relay device 30 at S66, the transmitter/receiver 51 of the management system 50 transmits relay device selection information to the starting terminal (terminal 10aa) (S67-1). The relay device selection information includes the IP address of the relay device 30a selected at S46, and the session ID "sel" generated at S64. Accordingly, the starting terminal (terminal 10aa) can obtain the IP address of the management system 50, which is the transmission source of the relay device selection information.

Further, the transmitter/receiver 51 of the management system 50 transmits the relay device selection information to the counterpart terminal (terminal 10db) via the communication network 2 (step S67-2). The relay device selection information includes the IP address of the relay device 30a selected at S66, the terminal ID "01aa" of the starting terminal (terminal 10aa), and the session ID "sel" generated at S64. Accordingly, the counterpart terminal (terminal 10db) can obtain, in execution of a session with the session ED "sel", the IP address of the management system 50, which is the transmission source of the relay device selection information.

Next, in response to the processing at S67-1, the starting terminal (terminal 10aa) transmits, from the transmitter/receiver 11 to the management system 50 via the communication network 2, reception completion information indicating completion of reception of the relay device selection information (step S68-1). The reception completion information includes the session ID transmitted or received in the processing at S67-1. Accordingly, the management system 50 can obtain information indicating completion of transmission of the relay device selection information, executed with the session ID "sel". Next, in response to the processing at S67-2, the counterpart terminal (terminal 10db) similarly transmits, to the management system 50, reception completion information indicating completion of reception of the relay device selection information at S67-2 (step S68-2).

Also in this case, the management system 50 can obtain information indicating completion of transmission of the relay device selection information, executed with the session ID "sel".

Next, referring to FIG. 25, the session manager 57 of the management system 50 stores the relay device ID of the selected relay device 30a, in a relay device ID field of a record for the session ID "sel" in the session management table (see FIG. 14) (S81).

Next, the data processor 59 of the management system 50 searches the terminal management table (see FIG. 12) using the terminal ID of the starting terminal (terminal 10aa) received at S62 as a search key, to read the corresponding service ID (step S82). The data processor 59 searches the service management table (FIG. 17) using the service ID read at S82 as a search key to obtain the operating parameters of the service contents (S83).

The transmitter/receiver 51 of the management system 50 transmits service information to the above-selected relay device 30a via the communication network 2 (step S84). The service information includes the session ID generated at S64 and the operating parameters (service contents) read at S83. In FIG. 25, the transmitter/receiver 51 of the management system 50 transmits the service information to the relay device 30a, and the transmitter/receiver 31 of the relay device 30a receives the service information.

Next, the data processor 39 of the relay device 30a newly stores the session ID and the operating parameters, received at S84, in association with each other in the service contents management table (see FIG. 8) (step S85).

Next, the data processor 59 of the management system 50 searches the terminal management table (see FIG. 12) by using the terminal IDs of the starting terminal (terminal 10aa) and the counterpart terminal (terminal 10db), received at S62, as search keys, thereby reading corresponding IP addresses (step S86).

The transmitter/receiver 51 of the management system 50 transmits relay start request information indicating a request for starting relaying to the above-selected relay device 30a via the communication network 2 (step S87). The relay start request information includes the IP addresses read out in the above-described processing at step S65. As the transmitter/receiver 31 of the relay device 30a receives the relay start request information, the data processor 39 of the relay device 30a stores the IP addresses received at S87 in association with the session ID received at S87. Accordingly, the relay device 30a can detect that the relay device 30a has been selected. Thus, the relay device 30a establishes a session for communicating image data having three resolutions, namely, low resolution, intermediate resolution, and high resolution, and sound data between the terminals (10aa and 10db) (step S88-1 and S88-2). Thus, the terminals (10aa and 10db) can start a videoconference between two sites.

Next, using FIGS. 6 and 26, operation of transmitting or receiving image data and sound data to carry out videoconference between the starting terminal (terminal 10aa) and the counterpart terminal (terminal 10db) will be described. Since the one-way operation of transmitting image data and sound data from the terminal 10aa to the terminal 10db and the other-way operation of transmitting image data and sound data from the terminal 10db to the terminal 10aa are the same processing in terms of transmission/reception of image data and sound data and later-described delay time detection, the former-mentioned one-way communication will be described, and the latter-mentioned other-way communication will be omitted.

First, the starting terminal (terminal 10aa) transmits image data of a subject, captured by the image capturer 14, and sound data of sounds, input by the sound input 15a, from the transmitter/receiver 11 to the relay device 30a via the communication network 2 using a session identified by the session ID "sel" (the image/sound data session sed illustrated in FIG. 1) (S101).

In the relay device 30a, in response to receiving the image data and the sound data by the transmitter/receiver 31, the quality changer 33 refers to the session ID, which is stored in the service contents management table (see FIG. 8), to change the image data and the sound data according to the operating parameters. The operating parameters in this example includes an image quality parameter and a sound quality parameter. In this case, when the quality of the image data and the quality of the sound data transmitted from the starting terminal (terminal 10aa) are values that are less than or equal to the image quality parameter and the sound quality parameter obtained from the service contents management table, respectively, the quality changer 33 does not change the quality of the image data and the quality of the sound data. In contrast, when the quality of the image data transmitted from the starting terminal (terminal 10aa) is a value that exceeds the image quality parameter, the quality changer 33 reduces the quality of the image data to the value of the image quality parameter. Similarly, when the quality of the sound data transmitted from the starting terminal (terminal 10aa) is a value that exceeds the sound quality parameter, the quality changer 33 reduces the quality of the sound data to the value of the sound quality parameter.

The data transmitter/receiver 31 of the relay device 30a transfers the image data and the sound data to the counterpart terminal (terminal 10db) through the image/sound data session sed (S103). Accordingly, the starting terminal (terminal 10aa) can transmit image data and sound data having qualities that are based on the service ID of the starting terminal (terminal 10aa). In the case of transmitting image data and sound data from the counterpart terminal (terminal 10db) to the starting terminal (terminal 10aa) via the relay device 30a, image data and sound data having qualities that are based on the service ID of the starting terminal (terminal 10aa) can be transmitted.

As described above in this embodiment, the management system 50 determines a service to be recommended to the terminal 10 based on an answer to a set of questions that are transmitted from the user at the terminal 10. Accordingly, the management system 50 can automatically determine a service that is suitable to the use environment or application of the terminal 10 by the user.

With acceptance by the user at the terminal 10 regarding the recommended service, the management system 50 configures the recommended service as a service to be provided to the terminal 10. With this configuration, the management system 50 is able to provide the service that is suitable to the use environment or application of the terminal 10 by the user. This further reduces burdens for the user to select a service by his or her own. Since the user only needs to answer a questionnaire, the user is not required to have any special knowledge such as technical knowledge about the network.

In the above-described embodiment, at S67, the management system 50 recommends one service that is most suitable to the use environment or application of the terminal 10 by the user, but this is just exemplary. For example, the management system 50 may select top three services having the highest preferential ratings for recommendation to the user. Alternatively, the management system 50 may display a list of all available services to the user, with the preferential rating. With such information, the user can select one of the services while using information regarding the preferential rating.

In the above-described embodiment, operation of FIG. 20 for configuring the service at the management system 50, and operation of FIGS. 24 to 26 for transmitting the service contents such as the operating parameters of the selected service to the relay device 30a are not consecutively performed. However, the operation may be performed in various other ways. For example, after processing at S50, the management system 50 may request the terminal 10aa to select a counterpart terminal 10 to start communication. Through this processing, S50 and S61 are performed consecutively. Through consecutively performing operation from answering the questionnaire to starting communication, operability for the user at the terminal 10 may improve.

The relay devices 30, the management system 50, the program providing system 90, and the maintenance system 100 in the above-described embodiment may be configured by a single computer or a plurality of computers to which divided portions (functions) are arbitrarily allocated. In addition, in the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a recording medium such as a CD-ROM storing the terminal program, the relay device program, or the transmission management program in the above-described embodiment, the HD 204 storing these programs, and the program providing system 90 including the HD 204 are used as program products in the case of providing the terminal program, the relay device program, and the transmission management program to users within a certain country or outside that country.

Although the date/time received is managed in FIGS. 10, 12, and 14, the embodiment is not limited to this, and, out of the date/time received, it is only necessary to manage at least the time received.

Further, although the IP address of each relay device 30 is managed in FIG. 10 and the IP address of each terminal 10 is managed in FIG. 12 in the above-described embodiment, the embodiment is not limited to this case, and the fully qualified domain name (FQDN) of each relay device 30 or each terminal 10 may be managed instead as long as an FQDN serves as relay device identification information for identifying each relay device 30 on the communication network 2 or terminal identification information for identifying each terminal 10 on the communication network 2. In this case, an IP address corresponding to an FQDN is obtained by a Domain Name System (DNS) server of the related art. Note that, not only "relay device identification information for identifying each relay device 30 on the communication network 2", but also "relay device connection destination information indicating a connection destination of each relay device 30 on the communication network 2", or "relay device counterpart terminal information indicating a counterpart terminal of each relay device 30 on the communication network 2" may be used. Similarly, not only "terminal identification information for identifying each terminal 10 on the communication network 2", but also "terminal connection destination information indicating a connection destination of each terminal 10 on the communication network 2", or "terminal counterpart terminal information indicating a counterpart terminal of each terminal 10 on the communication network 2" may be used.

In addition, although the case of a videoconference terminal has been described as an example of a communication terminal in the above-described embodiment, the embodiment is not limited to this case, and the communication system 1 may be a phone system such as an IP phone system or an Internet phone system. In addition, a smart phone, a mobile phone, a car navigation terminal, a wearable computer, a monitoring camera, an electronic blackboard, a projector, a game machine, or industrial equipment with a communication function may be used. A wearable computer includes a watch and a head-mounted display. Industrial equipment includes office equipment such as a multifunction peripheral (MFP) printer product, medical equipment such as an endoscope, and agricultural equipment such as a cultivator.

In addition, although image data and sound data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be at least one of image data, sound data, touch data, and smell data.

In addition, although the case in which a videoconference is held by the communication system 1 has been described in the above-described embodiment, the embodiment is not limited to this case. The communication system 1 may be used in meetings, general conversation between family members or friends, or one-way presentation of information.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A communication management system comprising:
    a memory that stores, for each one of a plurality of available services available to a first communication terminal, service identification information for identifying a service in association with an operating parameter for controlling a relay device, the operating parameter including at least an image quality parameter for controlling a quality of image data to be transmitted or received by the relay device;
    a transmitter that transmits questionnaire information to a second communication terminal to configure a service through a network, the questionnaire including a set of questions relating to the plurality of available services, the set of questions includes one or more questions regarding a user environment or an application of the first communication terminal to be provided with the plurality of available services;
    a receiver that receives answer information including a set of answers to the set of questions from the second communication terminal to configure the service through the network;
    processing circuitry that
        determines a service to be provided to the first communication terminal based on the answer information from the second communication terminal, from a plurality of services that are different in quality of content data, the content data including image data, to be transmitted to or received from the first communication terminal, and in service usage fee, the plurality of services include at least a service using the image data,
        stores, in the memory, service identification information for identifying the determined service associated with the first communication terminal,
        receives, from the first communication terminal, start request information for starting communication with a communication destination,
        in response to receiving the start request information, identifies the service identification information associated with the first communication terminal in the memory,
        identifies an operating parameter associated with the identified service identification information in the memory, and
        causes the transmitter to transmit to a relay device an operating parameter for controlling the relay device in transmitting or receiving the content data to or from the second communication terminal according to the determined service, the image quality parameter being associated with the determined service.

2. The communication management system of claim 1, wherein
    the transmitter transmits the questionnaire information, in response to receiving a request for configuring a service to be provided to the first communication terminal from the first communication terminal.

3. The communication management system of claim 1, wherein
    the questionnaire information includes, for each of the set of questions, contents of the question and a plurality of optional answers to the question, and
    each of the set of answers of the answer information is selected from the plurality of optional answers for each of the set of questions at the first communication terminal.

4. The communication management system of claim 1, wherein the memory further stores, for each one of the plurality of available services, preferential rating information indicating a preferential rating in using the service when a specific answer is selected for a specific question, and
    the processing circuitry determines the service to be provided to the first communication terminal based on the preferential rating information that is obtained from the memory using the answer information.

5. The communication management system of claim 4, wherein the processing circuitry further
    adds the preferential ratings obtained for all of the set of questions using all of the set of answers to calculate a total preferential rating for each one of the available services, and
    determines at least one of the available services having the highest total preferential rating as the service to be provided to the first communication terminal.

6. The communication management system of claim 1, wherein the operating parameter controls a quality of content data to be transmitted or received by the relay device to or from the second communication terminal, such that the quality of content data matches the determined service.

7. The communication management system of claim 1, wherein the image quality parameter includes at least one of an image frame rate, an image resolution, an image bit rate, an encoding format, and a color depth associated with the set of answers received form the first communication terminal.

8. A communication system comprising:
    the communication management system of claim 1; and
    the relay device configured to relay content data between the first communication terminal and the second communication terminal according to the operating parameter transmitted from the communication management system.

9. A method of controlling communication, comprising:
    storing, in a memory, for each one of a plurality of available services available to a first communication terminal, service identification information for identifying a service in association with an operating parameter for controlling a relay device, the operating parameter including at least an image quality parameter for controlling a quality of image data to be transmitted or received by the relay device;
    transmitting questionnaire information to a second communication terminal to configure a service through a network, the questionnaire including a set of questions relating to the plurality of available services, the set of questions includes one or more questions regarding a user environment or an application of the first communication terminal to be provided with the plurality of services;

receiving answer information including a set of answers to the set of questions from the second communication terminal to configure the service through the network;

determining a service to be provided to the first communication terminal based on the answer information from the second communication terminal, from a plurality of services that are different in quality of content data, including image data, to be transmitted to or received from the first communication terminal, and in service usage fee, the plurality of services including at least a service using the image data;

storing, in the memory, service identification information for identifying the determined service associated with the first communication terminal;

receiving, from the first communication terminal, start request information for starting communication with a communication destination;

in response to receiving the start request information, identifying the service identification information associated with the first communication terminal in the memory;

identifying an operating parameter associated with the identified service identification information in the memory; and transmitting to a relay device an operating parameter for controlling the relay device in transmitting or receiving the content data to or from the second communication terminal according to the determined service, the operating parameter including at least an image quality parameter for controlling a quality of image data to be transmitted or received by the relay device, the image quality parameter being associated with the determined service.

10. The method of claim 9, further comprising:

storing in a memory, for each one of the plurality of available services, preferential rating information indicating a preferential rating in using the service when a specific answer is selected for a specific question, wherein the determining includes determining the service to be provided to the first communication terminal based on the preferential rating information that is obtained from the memory using the answer information.

11. The method of claim 9, wherein the operating parameter controls a quality of content data to be transmitted or received by the relay device to or from the second communication terminal, such that the quality of content data matches the determined service.

12. The communication management system of claim 1, wherein the first communication terminal and the second communication terminal are the same communication terminal.

13. The communication management system of claim 1, wherein the first communication and the second communication terminal are different communication terminals.

14. The communication management system of claim 1, wherein the processing circuitry is further configured to:

associate a usage fee with a service ID of each available service to be provided to the first communication terminal, based on the answer information from the second communication terminal, and transmit, to the relay device, service content information, including the usage fee and the associated service ID.

15. The communication management system of claim 1, wherein the receiver is further configured to receive a recommended service and a service usage fee associated with the recommended service, in response to the received recommended service and the service usage fee, the transmitter is further configured to transmit a confirmation response of acceptance or rejection of the recommended service, and in response to a confirmation response of acceptance of the recommended service, the processing circuitry is further configured to display information regarding the content of the recommended service and the service usage fee on a display screen.

16. The communication management system of claim 1, wherein the usage fee is based on the image quality parameter.

17. The communication management system of claim 1, wherein the processing circuitry determines image data having a quality suitable to the user environment or the application of the first communication terminal, based on the set of answers from the plurality of services.

18. The communication management system of claim 1, wherein the processing circuitry is further configured to:

transmit an approval request, including at last a service fee, to the communication terminal, and in response to receiving an approval, store the service identification information in association with the communication terminal.

* * * * *